US011221127B2

(12) United States Patent
Freer et al.

(10) Patent No.: US 11,221,127 B2
(45) Date of Patent: Jan. 11, 2022

(54) ANTENNAE FOR HAZARDOUS LOCATION LIGHT FIXTURES

(71) Applicant: EATON INTELLIGENT POWER LIMITED, Dublin (IE)

(72) Inventors: Benjamin Avery Freer, Syracuse, NY (US); Daniel Robert Treible, Jr., Liverpool, NY (US); Joseph Michael Manahan, Manlius, NY (US); Andrew Francis Scarlata, West Monroe, NY (US); Adikaramge Asiri Jayawardena, Manlius, NY (US)

(73) Assignee: Eaton Intelligent Power Limited, Dublin (IE)

( * ) Notice: Subject to any disclaimer, the term of this patent is extended or adjusted under 35 U.S.C. 154(b) by 0 days.

(21) Appl. No.: 16/875,517

(22) Filed: May 15, 2020

(65) Prior Publication Data

US 2020/0278107 A1    Sep. 3, 2020

Related U.S. Application Data

(62) Division of application No. 15/724,005, filed on Oct. 3, 2017, now Pat. No. 10,655,833.

(Continued)

(51) Int. Cl.
*H01Q 1/00* (2006.01)
*H01Q 1/42* (2006.01)
(Continued)

(52) U.S. Cl.
CPC ............... *F21V 15/01* (2013.01); *F21V 5/04* (2013.01); *F21V 17/02* (2013.01); *F21V 17/107* (2013.01);
(Continued)

(58) Field of Classification Search
CPC ............ H01Q 1/002; H01Q 1/06; H01Q 1/22; H01Q 1/42; H01Q 1/44; H01Q 19/06;
(Continued)

(56) References Cited

U.S. PATENT DOCUMENTS

| 4,586,115 A | 4/1986 | Zimmerman et al. |
| 5,477,442 A | 12/1995 | Self |

(Continued)

FOREIGN PATENT DOCUMENTS

| CN | 201443739 | 4/2010 |
| CN | 101743573 A | 6/2010 |

(Continued)

OTHER PUBLICATIONS

Office action and English Translation issued in Chinese Application No. 201780073110.2, dated Dec. 8, 2020, 9 pages.

(Continued)

*Primary Examiner* — Andrea Lindgren Baltzell
*Assistant Examiner* — Patrick R Holecek
(74) *Attorney, Agent, or Firm* — Pearne & Gordon LLP

(57) ABSTRACT

A light fixture can include a housing comprising at least one wall that forms a cavity, wherein the housing complies with applicable standards for a hazardous environment. The light fixture can also include an antenna assembly disposed on an outer surface of the housing. The antenna assembly can provide communication with another device within the hazardous environment without compromising the applicable standards for the hazardous environment.

2 Claims, 14 Drawing Sheets

Related U.S. Application Data

(60) Provisional application No. 62/429,580, filed on Dec. 2, 2016.

(51) Int. Cl.

| | | |
|---|---|---|
| *F21V 25/12* | (2006.01) | |
| *F21V 23/06* | (2006.01) | |
| *F21V 15/01* | (2006.01) | |
| *F21V 5/04* | (2006.01) | |
| *H01Q 19/06* | (2006.01) | |
| *H05B 47/11* | (2020.01) | |
| *H05B 47/16* | (2020.01) | |
| *H05B 47/175* | (2020.01) | |
| *F21V 29/77* | (2015.01) | |
| *F21V 29/83* | (2015.01) | |
| *F21V 17/02* | (2006.01) | |
| *F21V 17/10* | (2006.01) | |
| *G01V 8/12* | (2006.01) | |
| *F21V 19/00* | (2006.01) | |
| *H05B 45/10* | (2020.01) | |
| *H05B 47/19* | (2020.01) | |
| *H05B 47/105* | (2020.01) | |
| *F21V 3/00* | (2015.01) | |
| *F21V 31/00* | (2006.01) | |
| *F21V 23/04* | (2006.01) | |
| *F21Y 115/10* | (2016.01) | |

(52) U.S. Cl.
CPC .......... *F21V 19/0015* (2013.01); *F21V 23/06* (2013.01); *F21V 25/12* (2013.01); *F21V 29/77* (2015.01); *F21V 29/773* (2015.01); *F21V 29/83* (2015.01); *G01V 8/12* (2013.01); *H01Q 1/002* (2013.01); *H01Q 1/42* (2013.01); *H01Q 19/06* (2013.01); *H05B 47/11* (2020.01); *H05B 47/16* (2020.01); *H05B 47/175* (2020.01); *F21V 3/00* (2013.01); *F21V 23/0471* (2013.01); *F21V 31/005* (2013.01); *F21Y 2115/10* (2016.08); *H05B 45/10* (2020.01); *H05B 47/105* (2020.01); *H05B 47/19* (2020.01)

(58) Field of Classification Search
CPC ........ F21V 25/12; F21V 25/125; F21V 23/06; F21V 31/00; F21V 31/005; F21V 29/77; F21V 29/773; H05B 47/175; H05B 47/19
See application file for complete search history.

(56) References Cited

U.S. PATENT DOCUMENTS

| | | |
|---|---|---|
| 5,578,905 A | 11/1996 | Graber |
| 5,890,797 A | 4/1999 | Bish |
| 6,034,325 A | 3/2000 | Nattel et al. |
| 6,894,659 B2* | 5/2005 | Pepperling ............ G01F 15/063 343/878 |
| D592,799 S | 5/2009 | Scott |
| 7,648,373 B2 | 1/2010 | Dixon et al. |
| 7,741,782 B2 | 6/2010 | Vermeulen et al. |
| 7,813,111 B2 | 10/2010 | Anderson et al. |
| 7,883,246 B2 | 2/2011 | Blincoe et al. |
| D639,500 S | 6/2011 | Choi et al. |
| 7,965,336 B2 | 6/2011 | Bingle et al. |
| D646,016 S | 9/2011 | Choi et al. |
| 8,097,221 B2* | 1/2012 | Incorvia ............ B01J 47/018 422/245.1 |
| D656,262 S | 3/2012 | Yoshinobu et al. |
| D656,263 S | 3/2012 | Ogawa et al. |
| 8,232,909 B2 | 7/2012 | Kroeger et al. |
| D672,480 S | 12/2012 | Maxik et al. |
| 8,322,897 B2 | 12/2012 | Blincoe et al. |
| 8,445,826 B2 | 5/2013 | Verfuerth |
| D684,286 S | 6/2013 | Rashidi |
| 8,480,249 B2 | 7/2013 | Curran et al. |
| 8,602,599 B2* | 12/2013 | Zimmer ............... F21V 7/0008 362/294 |
| D699,889 S | 2/2014 | Yasuji Fletcher et al. |
| 8,657,626 B2 | 2/2014 | Duval et al. |
| D700,991 S | 3/2014 | Johnson et al. |
| 9,060,394 B2 | 6/2015 | Ando et al. |
| 9,185,777 B2 | 11/2015 | Reed |
| 9,332,621 B2 | 5/2016 | Sagal et al. |
| 9,396,633 B1 | 7/2016 | Sannala |
| 9,404,624 B2 | 8/2016 | Chung |
| 9,442,215 B2 | 9/2016 | Kovacs et al. |
| 9,512,993 B2 | 12/2016 | Burmeister et al. |
| D776,836 S | 1/2017 | Tang |
| 9,605,821 B2 | 3/2017 | Al-Gaadi et al. |
| 9,626,847 B2 | 4/2017 | Spiro |
| 9,709,725 B2 | 7/2017 | Wilcox et al. |
| 9,713,228 B2 | 7/2017 | Reed |
| 9,730,297 B2 | 8/2017 | Brand et al. |
| D802,197 S | 11/2017 | Ding et al. |
| D803,427 S | 11/2017 | Germain |
| D809,176 S | 1/2018 | Partington |
| D822,859 S | 7/2018 | Wang et al. |
| 10,260,722 B2 | 4/2019 | Treible et al. |
| 10,655,833 B2* | 5/2020 | Freer ................. F21V 23/06 |
| 2004/0183744 A1 | 9/2004 | Raiman |
| 2005/0183344 A1 | 8/2005 | Ziobro et al. |
| 2008/0062705 A1 | 3/2008 | Czech et al. |
| 2008/0310162 A1 | 12/2008 | Thomas et al. |
| 2009/0046457 A1 | 2/2009 | Everhart |
| 2009/0081963 A1 | 3/2009 | Boren |
| 2009/0196037 A1 | 8/2009 | Xiao et al. |
| 2010/0109934 A1 | 5/2010 | Drake et al. |
| 2010/0188301 A1 | 7/2010 | Kishimoto et al. |
| 2010/0202136 A1 | 8/2010 | Vittozzi |
| 2010/0270933 A1 | 10/2010 | Chemel et al. |
| 2011/0121734 A1 | 5/2011 | Pape |
| 2011/0194280 A1 | 8/2011 | Ruffin, Jr. et al. |
| 2012/0040606 A1 | 2/2012 | Verfuerth |
| 2012/0206050 A1 | 8/2012 | Spero |
| 2012/0217872 A1 | 8/2012 | Eeles |
| 2012/0274208 A1 | 11/2012 | Chen et al. |
| 2013/0021808 A1 | 1/2013 | Harbers et al. |
| 2013/0063317 A1 | 3/2013 | Jonsson et al. |
| 2013/0135866 A1 | 5/2013 | Souvay et al. |
| 2013/0200807 A1 | 8/2013 | Mohan et al. |
| 2013/0301267 A1 | 11/2013 | Bradly et al. |
| 2013/0314921 A1 | 11/2013 | Chen |
| 2014/0085912 A1 | 3/2014 | David et al. |
| 2014/0199168 A1 | 7/2014 | Spiro |
| 2015/0276192 A1 | 10/2015 | Kafry et al. |
| 2015/0285480 A1 | 10/2015 | Chien et al. |
| 2015/0300610 A1 | 10/2015 | DeCarr et al. |
| 2015/0338074 A1 | 11/2015 | Chen et al. |
| 2015/0351195 A1 | 12/2015 | Sargent et al. |
| 2016/0138791 A1 | 5/2016 | Al-Gaadi et al. |
| 2016/0290619 A1 | 10/2016 | Galloppa et al. |
| 2016/0323972 A1 | 11/2016 | Bora et al. |
| 2016/0356474 A1 | 12/2016 | Jayawardena |
| 2017/0079121 A1 | 3/2017 | Jayawardena et al. |
| 2017/0156189 A1 | 6/2017 | Jayawardena et al. |
| 2017/0178497 A1 | 6/2017 | John et al. |
| 2017/0184659 A1 | 6/2017 | Jayawardena et al. |

FOREIGN PATENT DOCUMENTS

| | | |
|---|---|---|
| CN | 201954375 | 8/2011 |
| CN | 202419156 U | 9/2012 |
| CN | 202432348 | 9/2012 |
| CN | 202915191 U | 5/2013 |
| CN | 203298130 | 11/2013 |
| CN | 203743953 U | 7/2014 |
| CN | 203949680 U | 11/2014 |
| CN | 204420631 U | 6/2015 |
| CN | 204681603 | 9/2015 |
| CN | 204693339 U | 10/2015 |
| CN | 105351868 | 2/2016 |

(56) References Cited

FOREIGN PATENT DOCUMENTS

| CN | 105737116 A | 7/2016 |
|---|---|---|
| CN | 105939446 | 9/2016 |
| CN | 204879794 U | 12/2016 |
| GB | 722392 | 1/1955 |
| JP | S5357690 | 5/1978 |
| JP | 2014146568 | 8/2014 |
| WO | WO 2013111134 | 8/2013 |
| WO | WO 2016176455 | 11/2016 |
| WO | WO 2017005435 | 1/2017 |
| WO | WO 2018/102024 | 6/2018 |

OTHER PUBLICATIONS

Extended European Search Report issued in European Application No. 17875936.1, dated Sep. 11, 2020, 14 pages.
Extended European Search Report issued in European Application No. 17876715.8, dated Nov. 2, 2020, 10 pages.
Office action and English Translation issued in Chinese Application No. 201780069970.9, dated Apr. 9, 2020, 17 pages.
Office action and English Translation issued in Chinese Application No. 201780071788.7, dated Dec. 17, 2020, 12 pages.
Extended European Search Report issued in European Application No. 178756235, dated Aug. 21, 2020, 145 pages.
Partial Supplementary European Search Report for EP Application No. 17875623, dated May 14, 2020.
Partial Supplementary European Search Report for EP Application No. 17875936, dated Jun. 4, 2020.
Extended European Search Report for EP Application No. 17875933, dated May 7, 2020.
Office Action issued in Chinese Application No. 2017800723820, dated Jun. 30, 2020.
Office Action issued in Chinese Application No. 201780073110.2, dated Apr. 7, 2020.
Partial Supplementary European Search Report for EP Application No. 17876715.8, dated Jul. 20, 2020.
I. Istomin, International Search Report and Written Opinion issued in application No. PCT/US2017/064438, completion date Mar. 13, 2018, dated Mar. 22, 2018, 8 pages, Federal Institute of Industrial Property, Moscow, Russia.
Machine translation of CN203298130 via LexisNexis Total Patents, Sep. 26, 2017, 5 pages.
Machine translation of CN204681603 via LexisNexis Total Patents, Sep. 26, 2017, 4 pages.
Machine translation of CN105939446 via LexisNexis Total Patents, Sep. 26, 2017, 6 pages.
V. Surikov, International Search Report and Written Opinion issued in application No. PCT/US2017/054961, completion date Jan. 15, 2018, dated Jan. 18, 2018, 8 pages, Federal Institute of Industrial Property, Moscow, Russia.
S. Surikov, International Search Report and Written Opinion issued in application No. PCT/US2017/054957, completion date Dec. 25, 2017, dated Jan. 25, 2018, 9 pages, Federal Institute of Industrial Property, Moscow, Russia.
S. Surikov, International Search Report and Written Opinion issued in application No. PCT/US2017/064443, completion date Apr. 28, 2018, dated May 10, 2018, 7 pages, Federal Institute of Industrial Property, Moscow, Russia.
Translation of CN202432348 via LexisNexis Total Patents, Jun. 6, 2018, 6 pages.
Translation of CN201954375 via LexisNexis Total Patents, Jun. 6, 2018, 4 pages.
Translation of CN201443739 via Lexis Nexis Total Patents, Jun. 6, 2018, 6 pages.

* cited by examiner

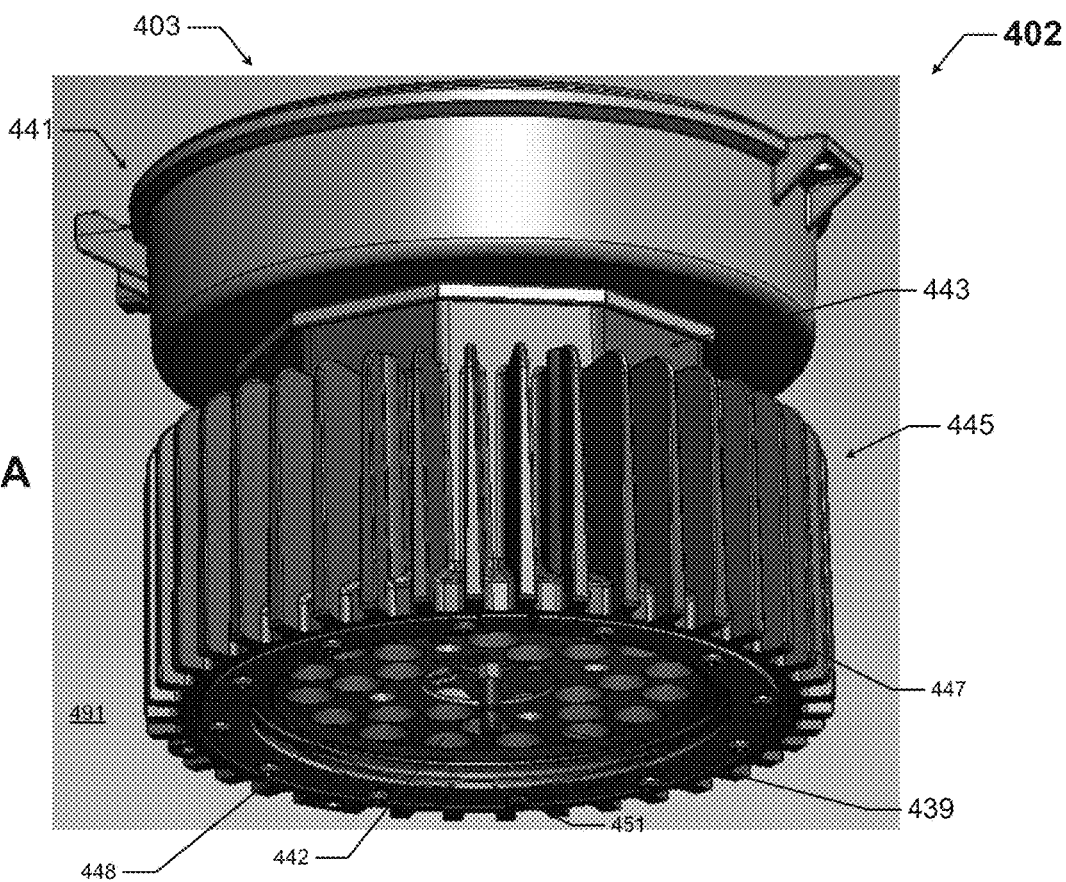

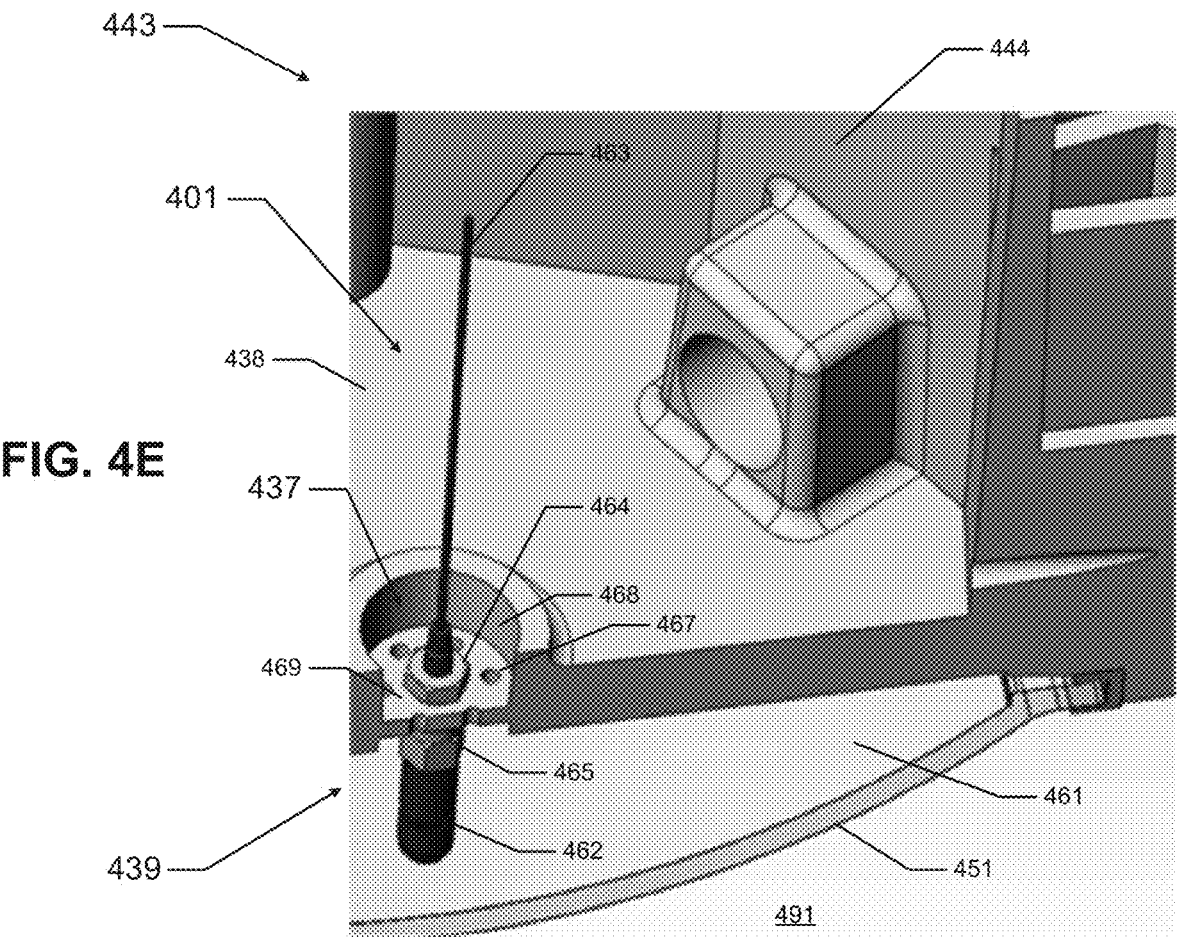

ANTENNAE FOR HAZARDOUS LOCATION LIGHT FIXTURES

CROSS-REFERENCE TO RELATED APPLICATIONS

This application is a divisional application of and claims priority under 35 U.S.C. § 121 to U.S. patent application Ser. No. 15/724,005, titled "Antennae For Hazardous Location Light Fixtures" and filed on Oct. 3, 2017, which itself claims priority to U.S. Provisional Patent Application Ser. No. 62/429,580, titled "Hazardous Location Light Fixtures" and filed on Dec. 2, 2016, which is related to U.S. patent application Ser. No. 15/382,143, titled "Prognostic and Health Monitoring Systems For Light Fixtures" and filed on Dec. 16, 2016. The entire contents of these aforementioned applications are hereby incorporated herein by reference.

TECHNICAL FIELD

The present disclosure relates generally to light fixtures located in hazardous environments, and more particularly to systems, methods, and devices for hazardous location light fixtures with antenna.

BACKGROUND

Light fixtures are used in a variety of environments. Many of these light fixtures use advanced technology with a number of components. As a result, these light fixtures can have a number of failure points. In lighting applications, such as hazardous environments, reliability of the lighting system is vital. Unfortunately, the characteristics (e.g., humidity, extreme temperatures, corrosive gas) of these environments can cause the failure of one or more components of a light fixture to be accelerated. Further, the health and safety of a person located in such an environment can be at risk, with or without the person's knowledge. When a light fixture is placed in certain environments, such as a hazardous environment, some of these components of a light fixture can pose a safety hazard and a violation of applicable standards if the components are not properly engineered and integrated with the rest of the light fixture.

SUMMARY

In general, in one aspect, the disclosure relates to a light fixture. The light fixture can a include a housing having at least one wall that forms a cavity, where the housing complies with applicable standards for a hazardous environment. The light fixture can also include an antenna assembly disposed on an outer surface of the housing. The antenna assembly can provide communication with another device within the hazardous environment without compromising the applicable standards for the hazardous environment.

In yet another aspect, the disclosure can generally relate to a light fixture. The light fixture can include a housing that complies with applicable standards for a hazardous environment. The light fixture can also include a controller. The light fixture can further include an antenna assembly communicably coupled to the controller. The antenna assembly can provide communication with another device within the hazardous environment without compromising the applicable standards for the hazardous environment applied to the housing. The antenna assembly can send and receive signals unobstructed by the housing.

In yet another aspect, the disclosure can generally relate to a light fixture. The light fixture can include a housing having at least one wall that forms a first cavity, where the housing complies with applicable standards for a hazardous environment. The light fixture can also include an antenna assembly disposed within the first cavity of the housing. The antenna assembly can provide communication with another device within the hazardous environment without compromising the applicable standards for the hazardous environment.

These and other aspects, objects, features, and embodiments will be apparent from the following description and the appended claims.

BRIEF DESCRIPTION OF THE DRAWINGS

The drawings illustrate only example embodiments and are therefore not to be considered limiting in scope, as the example embodiments may admit to other equally effective embodiments. The elements and features shown in the drawings are not necessarily to scale, emphasis instead being placed upon clearly illustrating the principles of the example embodiments. Additionally, certain dimensions or positions may be exaggerated to help visually convey such principles. In the drawings, reference numerals designate like or corresponding, but not necessarily identical, elements.

FIGS. 4A-4E show a light fixture with an antenna assembly in accordance with certain example embodiments.

DETAILED DESCRIPTION

Figure 1:
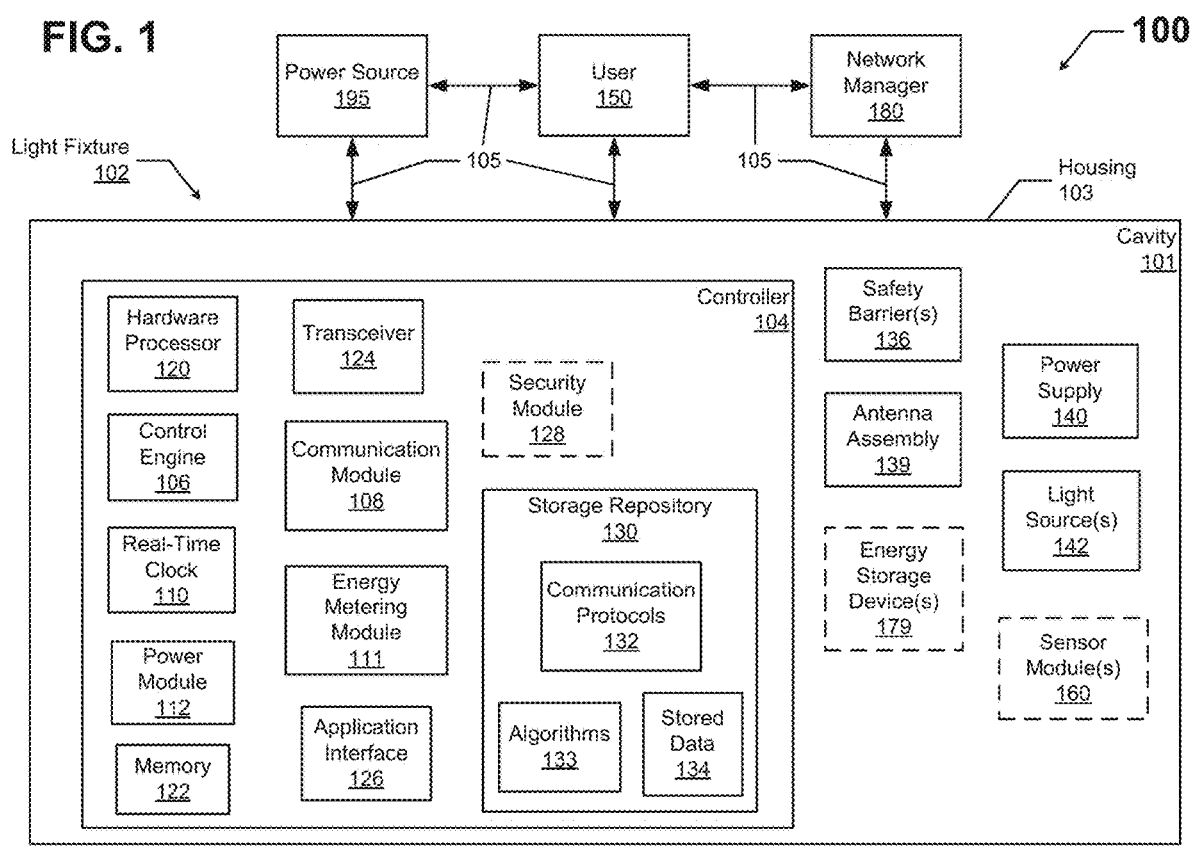
FIG. 1 shows a system diagram of a lighting system that includes a light fixture in accordance with certain example embodiments.

In general, example embodiments provide systems, methods, and devices for hazardous location light fixtures with antennae. Example hazardous location light fixtures with antennae provide a number of benefits. Such benefits can include, but are not limited to, preventing abrupt failure of light fixtures in critical applications, longer useful life of light fixtures, improved safety in areas where example light fixtures are located, reduced operating costs, and compliance with industry standards that apply to light fixtures located in certain environments.

In some cases, the example embodiments discussed herein can be used in any type of hazardous environment, including but not limited to an airplane hangar, a drilling rig (as for oil, gas, or water), a production rig (as for oil or gas), a refinery, a chemical plant, a power plant, a mining operation, a wastewater treatment facility, and a steel mill. A hazardous environment can include an explosion-proof environment, which would require an enclosure with an example moisture control system to meet one or more requirements, including but not limited to flame paths.

An explosion-proof enclosure is a type of hazardous location enclosure. In one or more example embodiments, an explosion-proof enclosure (also known as a flame-proof enclosure) is an enclosure that is configured to contain an explosion that originates inside the enclosure. Further, the explosion-proof enclosure is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface. In some cases, the housing of a light fixture that uses an example antenna can be considered an explosion-proof enclosure.

In one or more example embodiments, an explosion-proof enclosure is subject to meeting certain standards and/or requirements. For example, NEMA sets standards with which an enclosure must comply in order to qualify as an explosion-proof enclosure. Specifically, NEMA Type 7, Type 8, Type 9, and Type 10 enclosures set standards with which an explosion-proof enclosure within certain hazardous locations must comply. For example, a NEMA Type 7 standard applies to enclosures constructed for indoor use in certain hazardous locations. Hazardous locations may be defined by one or more of a number of authorities, including but not limited to the National Electric Code (e.g., Class 1, Division I) and UL (e.g., UL 1203). For example, a Class 1 hazardous area under the National Electric Code is an area in which flammable gases or vapors may be present in the air in sufficient quantities to be explosive.

As a specific example, NEMA standards for an explosion-proof enclosure of a certain size or range of sizes (e.g., greater than 100 in$^3$) may require that in a Group B, Division 1 area, any flame path of an explosion-proof enclosure must be at least 1 inch long (continuous and without interruption), and the gap between the surfaces cannot exceed 0.0015 inches. Standards created and maintained by NEMA may be found at www.nema.org/stds and are hereby incorporated by reference.

The example light fixtures having antennae (or components thereof) described herein can be made of one or more of a number of suitable materials to allow the light fixture and/or other associated components of a system to meet certain standards and/or regulations while also maintaining durability in light of the one or more conditions under which the light fixtures and/or other associated components of the system can be exposed. Examples of such materials can include, but are not limited to, aluminum, stainless steel, fiberglass, glass, plastic, ceramic, and rubber.

Example light fixtures (or portions thereof) having antennae described herein can be made from a single piece (as from a mold, injection mold, die cast, or extrusion process). In addition, or in the alternative, example light fixtures (or portions thereof) having antennae can be made from multiple pieces that are mechanically coupled to each other. In such a case, the multiple pieces can be mechanically coupled to each other using one or more of a number of coupling methods, including but not limited to epoxy, welding, fastening devices, compression fittings, mating threads, and slotted fittings. One or more pieces that are mechanically coupled to each other can be coupled to each other in one or more of a number of ways, including but not limited to fixedly, hingedly, removeably, slidably, and threadably.

Components and/or features described herein can include elements that are described as coupling, fastening, securing, or other similar terms. Such terms are merely meant to distinguish various elements and/or features within a component or device and are not meant to limit the capability or function of that particular element and/or feature. For example, a feature described as a "coupling feature" can couple, secure, fasten, abut against, and/or perform other functions aside from merely coupling.

A coupling feature (including a complementary coupling feature) as described herein can allow one or more components and/or portions of an example light fixture (e.g., a portion of an antenna assembly) to become mechanically coupled, directly or indirectly, to another portion of the light fixture (e.g., a housing). A coupling feature can include, but is not limited to, a portion of a hinge, an aperture, a recessed area, a protrusion, a slot, a spring clip, a male connector end, a female connector end, a tab, a detent, and mating threads. One portion of an example light fixture can be coupled to another portion of the light fixture by the direct use of one or more coupling features.

In addition, or in the alternative, a portion (e.g., a portion of an antenna assembly) of an example light fixture can be coupled to another portion (e.g., a housing) of the light fixture using one or more independent devices that interact with one or more coupling features disposed on a component of the light fixture. Examples of such devices can include, but are not limited to, a pin, a male connector end, a female connector end, a hinge, epoxy, welding, a fastening device (e.g., a bolt, a screw, a rivet), and a spring. One coupling feature described herein can be the same as, or different than, one or more other coupling features described herein. A complementary coupling feature as described herein can be a coupling feature that mechanically couples, directly or indirectly, with another coupling feature.

In the foregoing figures showing example embodiments of hazardous location light fixtures with antennae, one or more of the components shown may be omitted, repeated, and/or substituted. Accordingly, example embodiments of hazardous location light fixtures with antennae should not be considered limited to the specific arrangements of components shown in any of the figures. For example, features shown in one or more figures or described with respect to one embodiment can be applied to another embodiment associated with a different figure or description.

While example embodiments described herein are directed to light fixtures, integrating antenna can also be applied to any devices and/or components disposed within an electrical enclosure in a hazardous environment. As defined herein, an electrical enclosure is any type of cabinet or housing inside of which is disposed electrical, mechanical, electro-mechanical, and/or electronic equipment. Such equipment can include, but is not limited to, a controller (also called a control module), a hardware processor, a power supply (e.g., a battery, a driver, a ballast), a sensor module, a safety barrier, a sensor, sensor circuitry, a light source, electrical cables, and electrical conductors. Examples of an electrical enclosure can include, but are not limited to, a housing for a light fixture, a housing for a sensor device, an electrical connector, a junction box, a motor control center, a breaker box, an electrical housing, a conduit, a control panel, an indicating panel, and a control cabinet.

In certain example embodiments, light fixtures having antennae are subject to meeting certain standards and/or requirements. For example, the National Electric Code (NEC), Underwriters Laboratories (UL), the National Electrical Manufacturers Association (NEMA), the International Electrotechnical Commission (IEC), the Federal Communication Commission (FCC), the Illuminating Engineering Society (IES), the Occupational Health and Safety Administration (OSHA), and the Institute of Electrical and Electronics Engineers (IEEE) set standards as to electrical enclosures, wiring, and electrical connections. Use of example embodiments described herein meet (and/or allow a corresponding device to meet) such standards when required. For example, UL844 sets forth standards for luminaires that are used in hazardous locations. In some (e.g., PV solar) applications, additional standards particular to that application may be met by the electrical enclosures described herein.

In hazardous environments, radio frequency (RF) sent and received by an antenna assembly is considered a hazard. Further, the receiver/transmitter of an antenna assembly is jacketed or otherwise protected in a manner to withstand exposure to chemical vapor and dust in such hazardous environments. In addition, electrostatic buildup over time in the jacketing (often a polymer material) used for antenna construction can be considered a hazard. Further, in industrial environments, antenna assemblies can be exposed to significant abuse and risk of damage due to movement of machinery and tools. Such exposure to abuse and risk of damage creates an arcing and sparking hazard. Example embodiments avoid these risks and hazards. Further, example embodiments enable use of standard materials in construction, and also enables proliferation of wireless solutions in hazardous locations.

If a component of a figure is described but not expressly shown or labeled in that figure, the label used for a corresponding component in another figure can be inferred to that component. Conversely, if a component in a figure is labeled but not described, the description for such component can be substantially the same as the description for the corresponding component in another figure. The numbering scheme for the various components in the figures herein is such that each component is a three or four digit number and corresponding components in other figures have the identical last two digits.

In addition, a statement that a particular embodiment (e.g., as shown in a figure herein) does not have a particular feature or component does not mean, unless expressly stated, that such embodiment is not capable of having such feature or component. For example, for purposes of present or future claims herein, a feature or component that is described as not being included in an example embodiment shown in one or more particular drawings is capable of being included in one or more claims that correspond to such one or more particular drawings herein.

Example embodiments of light fixtures with antennae will be described more fully hereinafter with reference to the accompanying drawings, in which example embodiments of light fixtures with antennae are shown. Light fixtures with antennae may, however, be embodied in many different forms and should not be construed as limited to the example embodiments set forth herein. Rather, these example embodiments are provided so that this disclosure will be thorough and complete, and will fully convey the scope of light fixtures with antennae to those of ordinary skill in the art. Like, but not necessarily the same, elements (also sometimes called components) in the various figures are denoted by like reference numerals for consistency.

Terms such as "first", "second", "top", "bottom", "side", "distal", "proximal", and "within" are used merely to distinguish one component (or part of a component or state of a component) from another. Such terms are not meant to denote a preference or a particular orientation, and are not meant to limit embodiments of light fixtures with antennae. In the following detailed description of the example embodiments, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

FIG. 1 shows a system diagram of a lighting system 100 that includes a controller 104 of a light fixture 102 in accordance with certain example embodiments. The lighting system 100 can include a power source 195, a user 150, a network manager 180, and at least one light fixture 102. In addition to the controller 104, the light fixture 102 can include at least one optional safety barrier 136, one or more antennae assemblies 139, one or more optional energy storage devices 179, one or more optional sensor modules 160 (also more simply called a sensor 160 herein), at least one power supply 140, and at least one light source 142. The controller 104 can include one or more of a number of components. As shown in FIG. 1, such components can include, but are not limited to, a control engine 106, a communication module 108, a real-time clock 110, an energy metering module 111, a power module 112, a storage repository 130, a hardware processor 120, a memory 122, a transceiver 124, an application interface 126, and, optionally, a security module 128. The components shown in FIG. 1 are not exhaustive, and in some embodiments, one or more of the components shown in FIG. 1 may not be included in an example light fixture. Any component of the example light fixture 102 can be discrete or combined with one or more other components of the light fixture 102.

A user 150 can be any person that interacts with light fixtures or components thereof (e.g., an antenna assembly). Examples of a user 150 may include, but are not limited to, an engineer, an electrician, an instrumentation and controls technician, a mechanic, an operator, a consultant, an inventory management system, an inventory manager, a foreman, a labor scheduling system, a contractor, and a manufacturer's representative. The user 150 can use a user system (not shown), which may include a display (e.g., a GUI). The user 150 interacts with (e.g., sends data to, receives data from) the controller 104 of the light fixture 102 via the application interface 126 (described below). The user 150 can also interact with a network manager 180 and/or one or more of the sensor modules 160.

Interaction between the user 150 and the light fixture 102, the network manager 180, the power source 195, and the sensor modules 160 is conducted using communication links 105. Each communication link 105 can include wired (e.g., Class 1 electrical cables, Class 2 electrical cables, electrical connectors, power line carrier, DALI, RS485) and/or wireless (e.g., Wi-Fi, visible light communication, cellular networking, Bluetooth, WirelessHART, ISA100) technology. For example, a communication link 105 can be (or include) one or more electrical conductors that are coupled to the housing 103 of the light fixture 102 and to a sensor module 160. The communication link 105 can transmit signals (e.g., power signals, communication signals, control signals, data) between the light fixture 102 and the user 150, the network manager 180, the power source 195, and/or one or more of the sensor modules 160.

The network manager 180 is a device or component that controls all or a portion of a communication network that includes the controller 104 of the light fixture 102, additional light fixtures, and the sensor modules 160 that are communicably coupled to the controller 104. The network manager 180 can be substantially similar to the controller 104. Alternatively, the network manager 180 can include one or more of a number of features in addition to, or altered from, the features of the controller 104 described below. As described herein, communication with the network manager 180 can include communicating with one or more other components (e.g., another light fixture) of the system 100. In such a case, the network manager 180 can facilitate such communication.

The power source 195 of the system 100 provides AC mains or some other form of power to the light fixture 102, as well as to one or more other components (e.g., the network manager 180) of the system 100. The power source 195 can include one or more of a number of components. Examples of such components can include, but are not limited to, an electrical conductor, a coupling feature (e.g., an electrical connector), a transformer, an inductor, a resistor, a capacitor, a diode, a transistor, and a fuse. The power source 195 can be, or include, for example, a wall outlet, an energy storage device (e.g. a battery, a supercapacitor), a circuit breaker, and/or an independent source of generation (e.g., a photovoltaic solar generation system). The power source 195 can also include one or more components (e.g., a switch, a relay, a controller) that allow the power source 195 to communicate with and/or follow instructions from the user 150, the controller 104, and/or the network manager 180.

An optional energy storage device 179 can be any of a number of rechargeable batteries or similar storage devices that are configured to charge using some source of power (e.g., the primary power provided to the light fixture, ultraviolet rays). The energy storage device 179 can use one or more of any type of storage technology, including but not limited to a battery, a flywheel, an ultracapacitor, and a supercapacitor. If the energy storage device 179 includes a battery, the battery technology can vary, including but not limited to lithium ion, nickel-cadmium, lead/acid, solid state, graphite anode, titanium dioxide, nickel cadmium, nickel metal hydride, nickel iron, alkaline, and lithium polymer. In some cases, one or more of the energy storage devices 179 charge using a different level and/or type of power relative to the level and type of power of the primary power. In such a case, the power supply 179 can convert, invert, transform, and/or otherwise manipulate the primary power to the level and type of power used to charge the energy storage devices 179. There can be any number of energy storage devices 179.

The antenna assembly 139 can be any assembly of components that is used to improve the ability of the light fixture 102 (or portion thereof, such as the transceiver 124) to send and/or receive signals with the network manager 180, the power source 195, the user 150, another light fixture, a remote sensor 160, and/or some other device within the lighting system 100. The antenna assembly 139 can be used to convert electrical power into radio waves and/or convert radio waves into electrical power.

Figure 6A:
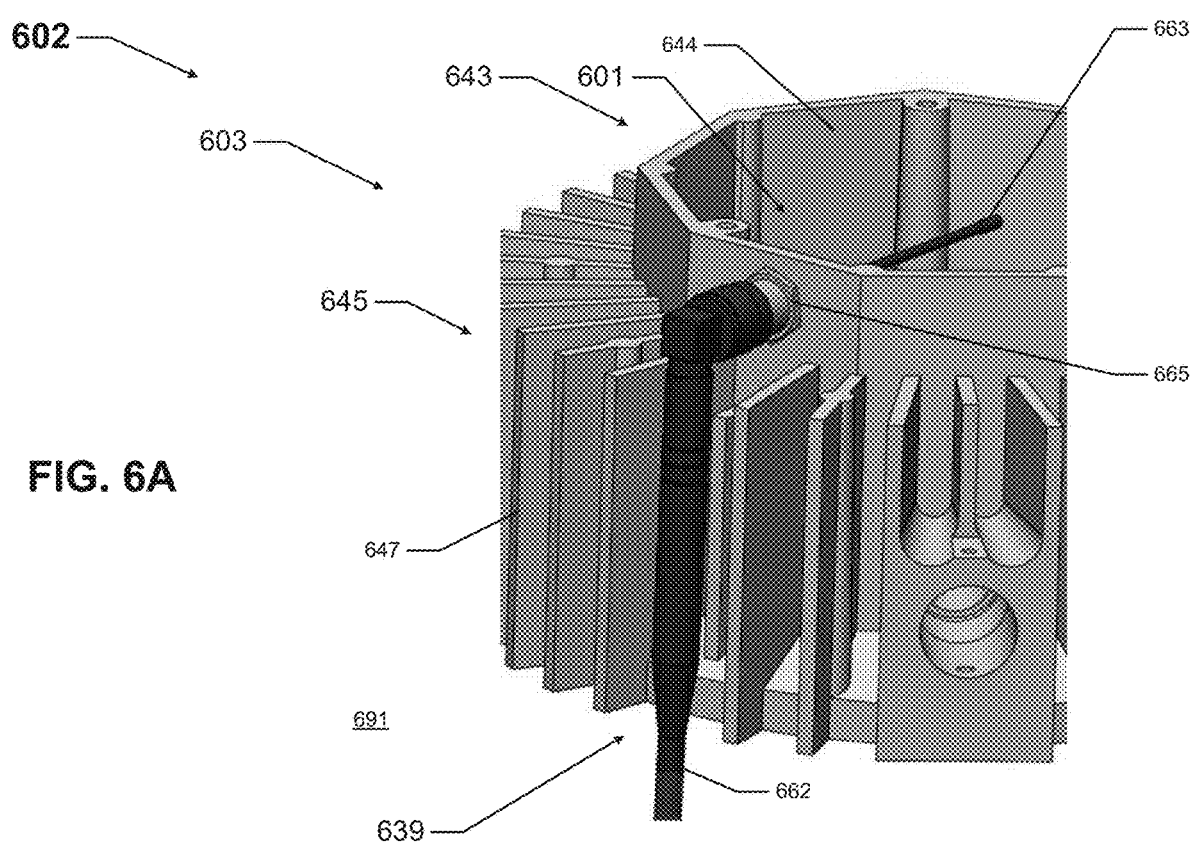
FIGS. 6A and 6B show a portion of yet another light fixture with an antenna assembly in accordance with certain example embodiments.
Figure 6B:
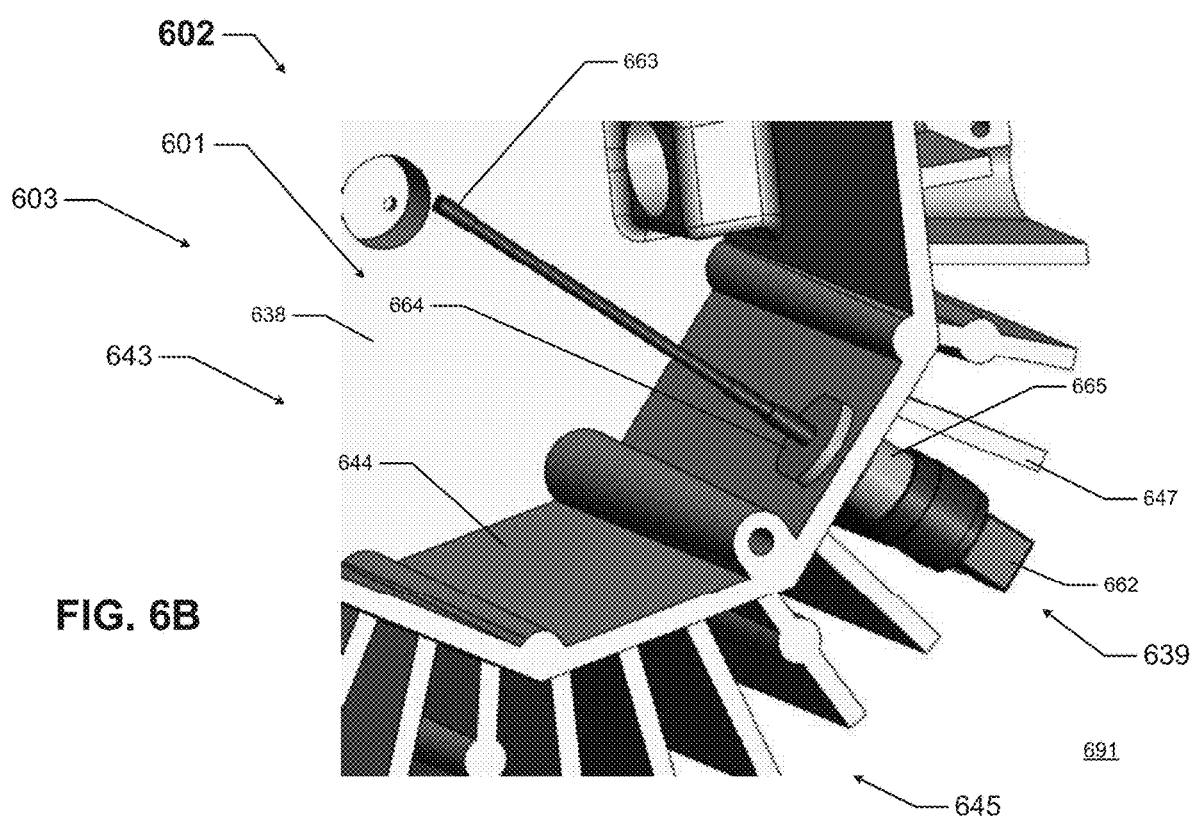

The antenna assembly 139 in example embodiments can be at least partially disposed within the housing 103 of the light fixture 102. For example, as shown in FIGS. 6A and 6B, part of the antenna assembly 139 can be disposed within the housing 103 of the light fixture 102, while the remainder of the antenna assembly 139 can be disposed outside the housing 103 (in the ambient environment) of the light fixture 102. As another example, as shown in FIGS. 4A-4E, the entire antenna assembly 139 can be disposed within the housing 103 of the light fixture 102 so that no portion of the antenna assembly 139 is exposed to the ambient environment. In such a case, the antenna assembly 139 is less likely to be damaged from some element (e.g., a moving object, corrosive effects) in the ambient environment in which the light fixture 102 is placed.

In certain example embodiments, the antenna assembly 139 includes one or more of a number of components. Such components can include, but are not limited to, a balun, a block upconverter, a cable (e.g., a coaxial cable or other form of communication link 105), a counterpoise (a type of ground system), a feed, a receiver, a passive radiator, a feed line, a rotator, a tuner, a transmitter, a low-noise block downconverter, and a twin lead. Portions of the antenna assembly 139 can be in direct communication with, or can be shared with, one or more components (e.g., the communications module 108) of the controller 104. For example, the transceiver 124 of the controller 104 can be in direct communication with the antenna assembly 139.

The one or more optional sensor modules 160 can be any type of sensing device that measure one or more parameters. Examples of types of sensor modules 160 can include, but are not limited to, a passive infrared sensor, a photocell, a pressure sensor, an air flow monitor, a gas detector, and a resistance temperature detector. A parameter that can be measured by a sensor module 160 can include, but is not limited to, motion, an amount of ambient light, temperature within the housing 103 of the light fixture 102, humidity within the housing 103 of the light fixture 102, air quality within the housing 103 of the light fixture 102, vibration, occupancy of a space, pressure, air flow, smoke (as from a fire), temperature (e.g., excessive heat, excessive cold, an ambient temperature) outside the housing 103 of the light fixture 102. More details about the sensor module 160, as well as the antenna 139, are provided in the figures below.

In some cases, the parameter or parameters measured by a sensor module 160 can be used to operate one or more light sources 142 of the light fixture 102. Each sensor module 160 can use one or more of a number of communication protocols. A sensor module 160 can be associated with the light fixture 102 or another light fixture in the system 100. A sensor module 160 can be located within the housing 103 of the light fixture 102, disposed on the housing 103 of the light fixture 102, or located outside the housing 103 of the light fixture 102.

In certain example embodiments, a sensor module 160 can include an energy storage device (e.g., a battery) that is used to provide power, at least in part, to some or all of the sensor module 160. In such a case, the energy storage device can be the same as, or independent of, the energy storage device 179, described above, of the light fixture 102. The energy storage device of the sensor module 160 can operate at all time or when a primary source of power to the light fixture 102 is interrupted. Further, a sensor module 160 can utilize or include one or more components (e.g., memory 122, storage repository 130, transceiver 124) found in the controller 104. In such a case, the controller 104 can provide the functionality of these components used by the sensor module 160. Alternatively, the sensor module 160 can include, either on its own or in shared responsibility with the controller 104, one or more of the components of the controller 104. In such a case, the sensor module 160 can correspond to a computer system as described below with regard to FIG. 2.

When the system 100 (or at least a portion of the antenna assembly 139) is located in a hazardous environment, that portion of the antenna assembly 139 can be intrinsically safe. As used herein, the term "intrinsically safe" refers to a device (e.g., a portion of the antenna assembly 139 described herein) that is placed in a hazardous environment. To be intrinsically safe, the device uses a limited amount of electrical energy so that sparks cannot occur from a short circuit or failures that can cause an explosive atmosphere found in hazardous environments to ignite. A safety barrier 136 is commonly used with an intrinsically safe device, where the safety barrier 136 limits the amount of power delivered to the sensor or other device to reduce the risk of explosion, fire, or other adverse condition that can be caused by high amounts of power in the hazardous environment. An adverse condition can also be an abnormal condition that is not potentially catastrophic in nature.

The optional safety barrier 136 can provide protection (e.g., overvoltage protection, overcurrent protection) for one or more components of the light fixture 102 when the light fixture 102 is located in a hazardous environment. For example, the safety barrier 136 can limit the amount of power delivered to the power module 112 of the controller 104 to reduce the risk of explosion, fire, or other adverse condition that can be caused by high amounts of power in the hazardous environment. The safety barrier 136 can be a required component when the light fixture 102 is located in a hazardous environment. For example, IEC 60079-11 requires that power must be less than 1.3 W during a fault condition. The safety barrier 136 can include one or more of a number of single or multiple discrete components (e.g., capacitor, inductor, transistor, diode, resistor, fuse), and/or a microprocessor. For example, a safety barrier 136 can be a capacitive barrier.

The user 150, the network manager 180, the power source 195, and/or the sensor modules 160 can interact with the controller 104 of the light fixture 102 using the application interface 126 in accordance with one or more example embodiments. Specifically, the application interface 126 of the controller 104 receives data (e.g., information, communications, instructions, updates to firmware) from and sends data (e.g., information, communications, instructions) to the user 150, the network manager 180, the power source 195, and/or each sensor module 160. The user 150, the network manager 180, the power source 195, and/or each sensor module 160 can include an interface to receive data from and send data to the controller 104 in certain example embodiments. Examples of such an interface can include, but are not limited to, a graphical user interface, a touchscreen, an application programming interface, a keyboard, a monitor, a mouse, a web service, a data protocol adapter, some other hardware and/or software, or any suitable combination thereof.

The controller 104, the user 150, the network manager 180, the power source 195, and/or the sensor modules 160 can use their own system or share a system in certain example embodiments. Such a system can be, or contain a form of, an Internet-based or an intranet-based computer system that is capable of communicating with various software. A computer system includes any type of computing device and/or communication device, including but not limited to the controller 104. Examples of such a system can include, but are not limited to, a desktop computer with LAN, WAN, Internet or intranet access, a laptop computer with LAN, WAN, Internet or intranet access, a smart phone, a server, a server farm, an android device (or equivalent), a tablet, smartphones, and a personal digital assistant (PDA). Such a system can correspond to a computer system as described below with regard to FIG. 2.

Further, as discussed above, such a system can have corresponding software (e.g., user software, sensor software, controller software, network manager software). The software can execute on the same or a separate device (e.g., a server, mainframe, desktop personal computer (PC), laptop, PDA, television, cable box, satellite box, kiosk, telephone, mobile phone, or other computing devices) and can be coupled by the communication network (e.g., Internet, Intranet, Extranet, Local Area Network (LAN), Wide Area Network (WAN), or other network communication methods) and/or communication channels, with wire and/or wireless segments according to some example embodiments. The software of one system can be a part of, or operate separately but in conjunction with, the software of another system within the system 100.

The light fixture 102 can include a housing 103. The housing 103 can include at least one wall that forms a cavity 101. In some cases, the housing can be designed to comply with any applicable standards so that the light fixture 102 can be located in a particular environment (e.g., a hazardous environment). For example, if the light fixture 102 is located in an explosive environment, the housing 103 can be explosion-proof. According to applicable industry standards, an explosion-proof enclosure is an enclosure that is configured to contain an explosion that originates inside, or can propagate through, the enclosure.

Continuing with this example, the explosion-proof enclosure, as a Division 1 enclosure, is configured to allow gases from inside the enclosure to escape across joints of the enclosure and cool as the gases exit the explosion-proof enclosure. The joints are also known as flame paths and exist where two surfaces meet and provide a path, from inside the explosion-proof enclosure to outside the explosion-proof enclosure, along which one or more gases may travel. A joint may be a mating of any two or more surfaces. Each surface may be any type of surface, including but not limited to a flat surface, a threaded surface, and a serrated surface. Alternatively, if the explosion-proof enclosure is a Division 2 enclosure, then it can be gasketed to prohibit/reduce the likelihood of ingress of hazardous gas to the enclosure, but would not have any "flame-paths" should the gas get in and become ignited.

The housing 103 of the light fixture 102 can be used to house one or more components of the light fixture 102, including one or more components of the controller 104. For example, as shown in FIG. 1, the controller 104 (which in this case includes the control engine 106, the communication module 108, the real-time clock 110, the energy metering module 111, the power module 112, the storage repository 130, the hardware processor 120, the memory 122, the transceiver 124, the application interface 126, and the optional security module 128), the power supply 140, and the light sources 142 are disposed in the cavity 101 formed by the housing 103. In alternative embodiments, any one or more of these or other components of the light fixture 102 can be disposed on the housing 103 and/or remotely from the housing 103.

The storage repository 130 can be a persistent storage device (or set of devices) that stores software and data used to assist the controller 104 in communicating with the user 150, the network manager 180, the power source 195, and one or more sensor modules 160 within the system 100. In one or more example embodiments, the storage repository 130 stores one or more communication protocols 132, algorithms 133, and stored data 134. The communication protocols 132 can be any of a number of protocols that are used to send and/or receive data between the controller 104 and the user 150, the network manager 180, the power source 195, and one or more sensor modules 160. One or more of the communication protocols 132 can be a time-synchronized protocol. Examples of such time-synchronized protocols can include, but are not limited to, a highway addressable remote transducer (HART) protocol, a wirelessHART protocol, and an International Society of Automation (ISA) 100 protocol. In this way, one or more of the communication protocols 132 can provide a layer of security to the data transferred within the system 100. Other protocols 132 can be associated with the use of Wi-Fi, Zigbee, visible light communication, cellular networking, Bluetooth low energy (BLE), and Bluetooth.

The algorithms 133 can be any procedures (e.g., a series of method steps), formulas, logic steps, mathematical models, forecasts, simulations, and/or other similar operational procedures that the control engine 106 of the controller 104 follows based on certain conditions at a point in time. An example of an algorithm 133 is measuring (using the energy metering module 111), storing (using the stored data 134 in the storage repository 130), and evaluating the current and voltage delivered to and delivered by the power supply 140 over time.

Algorithms 133 can be focused on certain components of the light fixture 102. For example, one or more algorithms 133 can facilitate communication between a sensor module 160 and the control engine 106 of the controller 104. As a specific example, one or more algorithms 133 can be used by the control engine 106 to instruct a sensor module 160 to measure a parameter, for the sensor module 160 to send the measurement to the control engine 106, for the control engine 106 to analyze the measurement, (stored as stored data 134) and for the control engine 106 to take an action (e.g., instruct, using a communication protocol 132, one or more other components of the light fixture 102 to operate) based on the result (stored as stored data 134) of the analysis.

As another example, one or more algorithms 133 can facilitate communication between an antenna 139 and the control engine 106 of the controller 104. As a specific example, one or more algorithms 133 can be used by the control engine 106 to receive (using a communication protocol 132) a signal received by the antenna 139, for the control engine 106 to analyze the signal, and for the control engine 106 to take an action (e.g., instruct one or more other components of the light fixture 102 to operate) based on the result of the analysis. As another specific example, one or more algorithms 133 can be used by the control engine 106 to determine that a communication to a device external to the light fixture 102 needs to be sent, and to send a communication signal (using a communication protocol 132 and saved as stored data 134) to the antenna 139.

One or more algorithms 133 can be used for more advanced functions. For example, some algorithms 133 can be focused on prognostic and health monitoring of the light fixture 102. As an example, there can be one or more algorithms 133 that focus on the integrity of the housing 103 of the light fixture 102. One such example of an algorithm 133 is predicting the life of a gasket (disposed, for example, between a cover and a body of the housing 103) of the light fixture 102 based on the temperature within the cavity 101 (as measured by a sensor module 160 and stored as stored data 134) and the characteristics of the gasket material (stored as stored data 134).

Another such example of an algorithm 133 is predicting the integrity of a gasket of the light fixture 102 by measuring air quality (using a sensor module 160) inside the cavity 103 proximate to the gasket over time, and determining that the gasket needs to be replaced when the air quality falls outside a range of normal values stored as stored data 134 (e.g., exceeds a threshold value). Still another such example of an algorithm 133 is monitoring moisture levels (as measured by a sensor module 160 and stored as stored data 134) within the housing 103 over time and notifying the user that there is a leak in the housing 103 when moisture levels exceed a threshold value (stored as stored data 134).

One or more algorithms 133 used in example embodiments can also be used to detect, in real time, instantaneous failures of one or more components of the light fixture 102. For example, if a power spike (e.g., a fault) at the power supply 140 is measured by the energy metering module 111, the control engine 106 can use one or more algorithms 133 to instantaneously, in real time, compare the excessively high voltage reading with a threshold value, determine that the voltage measurement represents a fault, and takes immediate action (e.g., opens a switch to stop receiving power from the source of the fault, uses a secondary source of power to maintain the operation of the light fixture 102) to minimize damage to the components of the light fixture 102 that can be caused by the fault and maintain a safe operating environment (e.g., allow the light sources 142 to continue to receive power to continue emitting light) in the area of the light fixture 102.

One or more algorithms 133 can be based on a "canary-in-a-coalmine" principal, where a redundant component is added to the light fixture 102 and is designed to fail prior to the other components serving the same function. When the redundant component fails, the other components serving the same function may be approaching failure, as well. As an example, when the light sources 142 use LED technology, a strip of LEDs (the "canary") that operate at a higher temperature relative to the rest of the LEDs (light sources 142) can be monitored (using one or more sensor modules 160) over time. When the "canary" light sources 142 begin to fail, an algorithm 133 can determine how far behind the other light sources 142 are from failing.

Other algorithms 133 can be directed to the light sources 142 of the light fixture 102. For example, lumen depreciation data collected under the LM-80 standard, developed by the IES, and published by LED package manufacturers can be stored as stored data 134 and compared with temperatures (as measured by one or more sensor modules 160 and stored as stored data 134) of light sources 142 of the light fixture 102 to see if a correlation can be developed. As another example, when one or more light sources 142 of the light fixture 102 are determined to begin failing, the algorithm 133 can direct the control engine 106 to generate an alarm for predictive maintenance.

As example, an algorithm 133 can continuously monitor the current (as measured by the energy metering module 111 and stored as stored data 134) output by the power supply 140 and the reference current. In addition to the dimmer setting, the algorithm can detect variations of the output current of the power supply 140 and the reference current for a given dimmer setting and predict failure of the power supply 140. In such a case, the direction of the variation can dictate whether there is a short circuit or an open circuit involved.

Another example algorithm 133 can measure and analyze the current output and current ripple of the power supply 140 over time. If the current ripple relative to the current output exceeds a threshold value, then the power supply 140 can be classified as failed. Yet another example algorithm 133 can monitor a temperature of a critical component (e.g., electrolytic capacitors, Controller IC, Blocking diode, TVS) of the power supply 140 over time. The estimated remaining life of the power supply 140 can be based on degradation curves of those components and threshold values established for those components.

Still another example algorithm 133 can measure and analyze the equivalent series resistance of the output electrolytic capacitors of the power supply 140 over time. An alarm can be generated by the control engine 106 when the resistance exceeds a threshold value, indicating failure of the power supply 140. Yet another example algorithm 133 can be to measure and analyze the magnitude and number of surges (ringing waves) that the power supply 140 is subjected to over time. The algorithm 133 can predict the expected useful life of the power supply 140 based on a threshold value. Still another example algorithm 133 can measure and analyze the efficiency of the power supply 140 over time. An alarm can be generated by the control engine 106 when the efficiency of the power supply 140 falls below a threshold value, indicating failure of the power supply 140.

An algorithm 133 can be based on stress models. For example, an algorithm 133 can develop a stress versus life relationship using accelerated life testing for the light fixture 102 or a component thereof. One instance would be an actual lifetime temperature of the power supply 140 versus a modeled or estimated temperature profile of the power supply 140. Another instance would be using LM-80 test data developed for the light sources 142.

As another example, an algorithm 133 can measure and analyze real-time application stress conditions of the light fixture 102 or components thereof over time and use developed models to estimate the life of the light fixture or components thereof. In such a case, mathematical models can be developed using one or more mathematical theories (e.g., Arrhenius theory, Palmgran-Miner Rules) to predict useful life of the light fixture 102 or components thereof under real stress conditions. As yet another example, an algorithm 133 can use predicted values and actual data to estimate the remaining life of the light fixture 102 or components thereof.

Stored data 134 can be any data associated with the light fixture 102 (including other light fixtures and/or any components thereof), any measurements taken by the sensor modules 160, measurements taken by the energy metering module 111, threshold values, results of previously run or calculated algorithms, and/or any other suitable data. Such data can be any type of data, including but not limited to historical data for the light fixture 102, historical data for other light fixtures, calculations, measurements taken by the energy metering module 111, and measurements taken by one or more sensor modules 160. The stored data 134 can be associated with some measurement of time derived, for example, from the real-time clock 110.

Examples of a storage repository 130 can include, but are not limited to, a database (or a number of databases), a file system, a hard drive, flash memory, some other form of solid state data storage, or any suitable combination thereof. The storage repository 130 can be located on multiple physical machines, each storing all or a portion of the communication protocols 132, the algorithms 133, and/or the stored data 134 according to some example embodiments. Each storage unit or device can be physically located in the same or in a different geographic location.

The storage repository 130 can be operatively connected to the control engine 106. In one or more example embodiments, the control engine 106 includes functionality to communicate with the user 150, the network manager 180, the power source 195, and the sensor modules 160 in the system 100. More specifically, the control engine 106 sends information to and/or receives information from the storage repository 130 in order to communicate with the user 150, the network manager 180, the power source 195, and the sensor modules 160. As discussed below, the storage repository 130 can also be operatively connected to the communication module 108 in certain example embodiments.

In certain example embodiments, the control engine 106 of the controller 104 controls the operation of one or more components (e.g., the communication module 108, the real-time clock 110, the transceiver 124) of the controller 104. For example, the control engine 106 can activate the communication module 108 when the communication module 108 is in "sleep" mode and when the communication module 108 is needed to send data received from another component (e.g., a sensor module 160, the user 150) in the system 100.

As another example, the control engine 106 can acquire the current time using the real-time clock 110. The real time clock 110 can enable the controller 104 to control the light fixture 102 even when the controller 104 has no communication with the network manager 180. As yet another example, the control engine 106 can direct the energy metering module 111 to measure and send power consumption information of the light fixture 102 to the network manager 180. In some cases, the control engine 106 of the controller 104 can generate and send a dimming signal (e.g., 0-10 V DC) to the power supply 140, which causes the power supply 140 to adjust the light output of the light sources 142.

The control engine 106 of the controller 104 can communicate, in some cases using the antenna assembly 139, with one or more of the sensor modules 160 and make determinations based on measurements made by the sensor modules 160. For example, the control engine 106 can use one or more algorithms 133 to facilitate communication with a sensor module 160. As a specific example, the control engine 160 can use one or more algorithms 133 to instruct a sensor module 160 to measure a parameter, for the sensor module 160 to send the measurement to the control engine 106, for the control engine 106 to analyze the measurement, (stored as stored data 134) and for the control engine 106 to take an action (e.g., instruct, using a communication protocol 132, one or more other components of the light fixture 102 to operate) based on the result (stored as stored data 134) of the analysis.

The control engine 106 can also use the antenna assembly 139 to send and/or receive communications. As a specific example, the control engine 106 can use one or more algorithms 133 to receive (using a communication protocol 132) a signal received by the antenna assembly 139, for the control engine 106 to analyze the signal, and for the control engine 106 to take an action (e.g., instruct one or more other components of the light fixture 102 to operate) based on the result of the analysis. As another specific example, the control engine 106 can use one or more algorithms 133 to determine that a communication to a device external to the light fixture 102 needs to be sent, and to send a communication signal (using a communication protocol 132 and saved as stored data 134) to the antenna assembly 139.

The control engine 106 can also use the antenna assembly 139 to perform more advanced functions. For example, the control engine 106 can be configured to perform a number of functions that help prognosticate and monitor the health of the light fixture 102 (or components thereof), either continually or on a periodic basis, using the antenna assembly 139. In other words, the control engine 106 analyzes one or more factors that can affect the longevity of one or more components of the light fixture 102 using the antenna assembly 139. For example, the control engine 106 can execute any of the algorithms 133 stored in the storage repository 130. As a specific example, the control engine 106 can measure (using the energy metering module 111), store (as stored data 134 in the storage repository 130), and evaluate, using an algorithm 133, the current and voltage delivered to and delivered by the power supply 140 over time.

As another specific example, the control engine 106 can use one or more algorithms 133 that focus on certain components of the light fixture 102. For example, the control engine 106 can use one or more algorithms 133 that focus on the integrity of the housing 103 of the light fixture 102. As stated above, one such example of an algorithm 133 is predicting the life of a gasket (disposed, for example, between a cover and a body of the housing 103) of the light fixture 102 based on the temperature within the cavity 101 (as measured by a sensor module 160 and stored as stored data 134) and the characteristics of the gasket material (stored as stored data 134). In such a case, the control engine 106 can control the sensor modules 160 that perform the measurements.

The control engine 106 can also detect, in real time, instantaneous failures of one or more components of the light fixture 102. For example, if a power spike (e.g., a fault) at the power supply 140 is measured by the energy metering module 111, the control engine 106 can instantaneously, in real time, compare the excessively high voltage reading with a threshold value, determine that the voltage measurement represents a fault, and takes immediate action (e.g., opens a switch to stop receiving power from the source of the fault, uses a secondary source of power to maintain the operation of the light fixture 102) to minimize damage to the components of the light fixture 102 that can be caused by the fault and maintain a safe operating environment (e.g., allow the light sources 142 to continue to receive power to continue emitting light) in the area of the light fixture 102.

The control engine 106 can also collect data, under the LM-80 standard, of one or more light sources 142, store the data as stored data 134, and compare this data with temperatures (as measured by one or more sensor modules 160 and stored as stored data 134) of light sources 142 of the light fixture 102 to see if a correlation can be developed. For instance, data generated by a component manufacturer (e.g., information about the light source 142 listed on the packaging for the light fixture 102) using a reliability testing protocols (e.g., IES LM-80) can be used to generate stress versus life correlation models. Subsequently, those models can be stored in the storage repository 130 as algorithms 133 by the control engine 106. The real-time stress information collected in the application environment using multiple sensor modules 160 can be used by the control engine 106, along with stress-life models stored in storage repository 130, to predict the useful life of the light fixture 102 and/or components thereof. As another example, the control engine 106 can determine whether one or more light sources 142 of the light fixture 102 are failing and generate an alarm for predictive maintenance.

As another example, the control engine 106 can be configured to continuously monitor the current (as measured by the energy metering module 111 and stored as stored data 134) output by the power supply 140 and the reference current. The control engine 106 can also determine the dimmer setting, and so detect variations of the output current of the power supply 140 and the reference current for a given dimmer setting and predict failure of the power supply 140. In such a case, the direction of the variation can dictate whether there is a short circuit or an open circuit involved. The control engine 106 can also monitor the antenna assembly 139 to ensure that it is working properly and send a notification (e.g., to a user 150, to the network manager 180) when the control engine 106 determines that the antenna assembly 139 is failing or has failed.

As yet another example, the control engine 106 can measure (using one or more sensor modules 160) and analyze the current output and current ripple of the power supply 140 over time. If the current ripple (e.g., peak-to-peak ripple current, RMS current) relative to the current output exceeds a threshold value, then the control engine 106 can classify the power supply 140 as failed. As still another example, the control engine 106 can monitor a temperature (using one or more sensor modules 160) of a critical component (e.g., electrolytic capacitors, Controller IC, Blocking diode, TVS) of the power supply 140 over time. The control engine 106 can estimate the remaining life of the power supply 140 based on degradation curves of those components and threshold values established for those components.

The control engine 106 can provide, in some cases using the antenna assembly 139, control, communication, and/or other similar signals to the user 150, the network manager 180, the power source 195, and one or more of the sensor modules 160. Similarly, the control engine 106 can receive, in some cases using the antenna assembly 139, control, communication, and/or other similar signals from the user 150, the network manager 180, the power source 195, and one or more of the sensor modules 160. The control engine 106 can control each sensor module 160 automatically (for example, based on one or more algorithms stored in the control engine 106) and/or based on control, communication, and/or other similar signals received from another device through a communication link 105. The control engine 106 may include a printed circuit board, upon which the hardware processor 120 and/or one or more discrete components of the controller 104 are positioned.

In certain embodiments, the control engine 106 of the controller 104 can communicate, in some cases using the antenna assembly 139, with one or more components of a system external to the system 100. For example, the control engine 106 can interact with an inventory management system by ordering a light fixture (or one or more components thereof) to replace the light fixture 102 (or one or more components thereof) that the control engine 106 has determined to fail or be failing. As another example, the control engine 106 can interact with a workforce scheduling system by scheduling a maintenance crew to repair or replace the light fixture 102 (or portion thereof) when the control engine 106 determines that the light fixture 102 or portion thereof requires maintenance or replacement. In this way, the controller 104 is capable of performing a number of functions beyond what could reasonably be considered a routine task.

In certain example embodiments, the control engine 106 can include an interface that enables the control engine 106 to communicate with one or more components (e.g., power supply 140) of the light fixture 102. For example, if the power supply 140 of the light fixture 102 operates under IEC Standard 62386, then the power supply 140 can have a serial communication interface that will transfer data (e.g., stored data 134) measured by the sensor modules 160. In such a case, the control engine 106 can also include a serial interface to enable communication with the power supply 140 within the light fixture 102. Such an interface can operate in conjunction with, or independently of, the communication protocols 132 used to communicate between the controller 104 and the user 150, the network manager 180, the power source 195, and the sensor modules 160.

The control engine 106 (or other components of the controller 104) can also include one or more hardware components and/or software elements to perform its functions. Such components can include, but are not limited to, a universal asynchronous receiver/transmitter (UART), a serial peripheral interface (SPI), a direct-attached capacity (DAC) storage device, an analog-to-digital converter, an inter-integrated circuit (I$^2$C), and a pulse width modulator (PWM).

The communication module 108 of the controller 104 determines and implements the communication protocol (e.g., from the communication protocols 132 of the storage repository 130) that is used when the control engine 106 communicates with (e.g., sends signals to, receives signals from) the user 150, the network manager 180, the power source 195, and/or one or more of the sensor modules 160. In some cases, the communication module 108 accesses the stored data 134 to determine which communication protocol is used to communicate with the sensor module 160 associated with the stored data 134. In addition, the communication module 108 can interpret the communication protocol of a communication received by the controller 104 so that the control engine 106 can interpret the communication.

The communication module 108 can send and receive data, using the antenna assembly 139, between the network manager 180, the power source 195, the sensor modules 160, and/or the users 150 and the controller 104. The communication module 108 can send and/or receive data in a given format that follows a particular communication protocol 132. The control engine 106 can interpret the data packet received from the communication module 108 using the communication protocol 132 information stored in the storage repository 130. The control engine 106 can also facilitate the data transfer between one or more sensor modules 160 and the network manager 180 or a user 150 by converting the data into a format understood by the communication module 108.

The communication module 108 can send data (e.g., communication protocols 132, algorithms 133, stored data 134, operational information, alarms) directly to and/or retrieve data directly from the storage repository 130. Alternatively, the control engine 106 can facilitate the transfer of data between the communication module 108 and the storage repository 130. The communication module 108 can also provide encryption to data that is sent by the controller 104 and decryption to data that is received by the controller 104. The communication module 108 can also provide one or more of a number of other services with respect to data sent from and received by the controller 104. Such services can include, but are not limited to, data packet routing information and procedures to follow in the event of data interruption.

The real-time clock 110 of the controller 104 can track clock time, intervals of time, an amount of time, and/or any other measure of time. The real-time clock 110 can also count the number of occurrences of an event, whether with or without respect to time. Alternatively, the control engine 106 can perform the counting function. The real-time clock 110 is able to track multiple time measurements concurrently. The real-time clock 110 can track time periods based on an instruction received from the control engine 106, based on an instruction received from the user 150, based on an instruction programmed in the software for the controller 104, based on some other condition or from some other component, or from any combination thereof.

The real-time clock 110 can be configured to track time when there is no power delivered to the controller 104 (e.g., the power module 112 malfunctions) using, for example, a super capacitor or a battery backup. In such a case, when there is a resumption of power delivery to the controller 104, the real-time clock 110 can communicate any aspect of time to the controller 104. In such a case, the real-time clock 110 can include one or more of a number of components (e.g., a super capacitor, an integrated circuit) to perform these functions.

The energy metering module 111 of the controller 104 measures one or more components of power (e.g., current, voltage, resistance, VARs, watts) at one or more points within the light fixture 102. The energy metering module 111 can include any of a number of measuring devices and related devices, including but not limited to a voltmeter, an ammeter, a power meter, an ohmmeter, a current transformer, a potential transformer, and electrical wiring. The energy metering module 111 can measure a component of power continuously, periodically, based on the occurrence of an event, based on a command received from the control module 106, and/or based on some other factor. For purposes herein, the energy metering module 111 can be considered a type of sensor (e.g., sensor module 160). In this way, a component of power measured by the energy metering module 111 can be considered a parameter herein.

The power module 112 of the controller 104 provides power to one or more other components (e.g., real-time clock 110, control engine 106) of the controller 104. In addition, in certain example embodiments, the power module 112 can provide power to the power supply 140 of the light fixture 102. The power module 112 can include one or more of a number of single or multiple discrete components (e.g., transistor, diode, resistor), and/or a microprocessor. The power module 112 may include a printed circuit board, upon which the microprocessor and/or one or more discrete components are positioned. In some cases, the power module 112 can include one or more components that allow the power module 112 to measure one or more elements of power (e.g., voltage, current) that is delivered to and/or sent from the power module 112. Alternatively, the controller 104 can include a power metering module (not shown) to measure one or more elements of power that flows into, out of, and/or within the controller 104. Such a power metering module can also be considered a type of sensor (e.g., sensor module 160) herein.

The power module 112 can include one or more components (e.g., a transformer, a diode bridge, an inverter, a converter) that receives power (for example, through an electrical cable) from a source external to the light fixture 102 and generates power of a type (e.g., alternating current, direct current) and level (e.g., 12V, 24V, 120V) that can be used by the other components of the controller 104 and/or by the power supply 140. The power module 112 can use a closed control loop to maintain a preconfigured voltage or current with a tight tolerance at the output. The power module 112 can also protect the rest of the electronics (e.g., hardware processor 120, transceiver 124) in the light fixture 102 from surges generated in the line.

In addition, or in the alternative, the power module 112 can be a source of power in itself to provide signals to the other components of the controller 104 and/or the power supply 140. For example, the power module 112 can be a battery. As another example, the power module 112 can be a localized photovoltaic power system. The power module 112 can also have sufficient isolation in the associated components of the power module 112 (e.g., transformers, opto-couplers, current and voltage limiting devices) so that the power module 112 is certified to provide power to an intrinsically safe circuit.

In certain example embodiments, the power module 112 of the controller 104 can also provide power and/or control signals, directly or indirectly, to one or more of the sensor modules 160. In such a case, the control engine 106 can direct the power generated by the power module 112 to the sensor modules 160 and/or the power supply 140 of the light fixture 102. In this way, power can be conserved by sending power to the sensor modules 160 and/or the power supply 140 of the light fixture 102 when those devices need power, as determined by the control engine 106.

The hardware processor 120 of the controller 104 executes software, algorithms, and firmware in accordance with one or more example embodiments. Specifically, the hardware processor 120 can execute software on the control engine 106 or any other portion of the controller 104, as well as software used by the user 150, the network manager 180, the power source 195, and/or one or more of the sensor modules 160. The hardware processor 120 can be an integrated circuit, a central processing unit, a multi-core processing chip, SoC, a multi-chip module including multiple multi-core processing chips, or other hardware processor in one or more example embodiments. The hardware processor 120 is known by other names, including but not limited to a computer processor, a microprocessor, and a multi-core processor.

In one or more example embodiments, the hardware processor 120 executes software instructions stored in memory 122. The memory 122 includes one or more cache memories, main memory, and/or any other suitable type of memory. The memory 122 can include volatile and/or non-volatile memory. The memory 122 is discretely located within the controller 104 relative to the hardware processor 120 according to some example embodiments. In certain configurations, the memory 122 can be integrated with the hardware processor 120.

In certain example embodiments, the controller 104 does not include a hardware processor 120. In such a case, the controller 104 can include, as an example, one or more field programmable gate arrays (FPGA), one or more insulated-gate bipolar transistors (IGBTs), one or more integrated circuits (ICs). Using FPGAs, IGBTs, ICs, and/or other similar devices known in the art allows the controller 104 (or portions thereof) to be programmable and function according to certain logic rules and thresholds without the use of a hardware processor. Alternatively, FPGAs, IGBTs, ICs, and/or similar devices can be used in conjunction with one or more hardware processors 120.

The transceiver 124 of the controller 104 can send and/or receive control and/or communication signals. Specifically, the transceiver 124 can be used to transfer data between the controller 104 and the user 150, the network manager 180, the power source 195, and/or the sensor modules 160. The transceiver 124 can use wired and/or wireless technology. The transceiver 124 can be configured in such a way that the control and/or communication signals sent and/or received by the transceiver 124 can be received and/or sent by another transceiver that is part of the user 150, the network manager 180, the power source 195, and/or the sensor modules 160. The transceiver 124 can use any of a number of signal types, including but not limited to radio signals.

When the transceiver 124 uses wireless technology, any type of wireless technology can be used by the transceiver 124 in sending and receiving signals. Such wireless technology can include, but is not limited to, Wi-Fi, Zigbee, visible light communication, cellular networking, Bluetooth low energy (BLE), and Bluetooth. The transceiver 124 can use one or more of any number of suitable communication protocols (e.g., ISA100, HART) when sending and/or receiving signals. Such communication protocols can be stored in the communication protocols 132 of the storage repository 130. Further, any transceiver information for the user 150, the network manager 180, the power source 195, and/or the sensor modules 160 can be part of the stored data 134 (or similar areas) of the storage repository 130.

Optionally, in one or more example embodiments, the security module 128 secures interactions between the controller 104, the user 150, the network manager 180, the power source 195, and/or the sensor modules 160. More specifically, the security module 128 authenticates communication from software based on security keys verifying the identity of the source of the communication. For example, user software may be associated with a security key enabling the software of the user 150 to interact with the controller 104 and/or the sensor modules 160. Further, the security module 128 can restrict receipt of information, requests for information, and/or access to information in some example embodiments.

As mentioned above, aside from the controller 104 and its components, the light fixture 102 can include a power supply 140 and one or more light sources 142. The light sources 142 of the light fixture 102 are devices and/or components typically found in a light fixture to allow the light fixture 102 to operate. The light fixture 102 can have one or more of any number and/or type of light sources 142. Examples of such light sources 142 can include, but are not limited to, a local control module, a light source, a light engine, a heat sink, an electrical conductor or electrical cable, a terminal block, a lens, a diffuser, a reflector, an air moving device, a baffle, a dimmer, and a circuit board. A light source 142 can use any type of lighting technology, including but not limited to LED, incandescent, sodium vapor, and fluorescent.

The power supply 140 of the light fixture 102 provides power to one or more of the light sources 142. The power supply 140 can be called by any of a number of other names, including but not limited to a driver, a LED driver, and a ballast. The power supply 140 can be substantially the same as, or different than, the power module 112 of the controller 104. The power supply 140 can include one or more of a number of single or multiple discrete components (e.g., transistor, diode, resistor), and/or a microprocessor. The power supply 140 may include a printed circuit board, upon which the microprocessor and/or one or more discrete components are positioned, and/or a dimmer.

The power supply 140 can include one or more components (e.g., a transformer, a diode bridge, an inverter, a converter) that receives power (for example, through an electrical cable) from the power module 112 of the controller 104 and generates power of a type (e.g., alternating current, direct current) and level (e.g., 12V, 24V, 120V) that can be used by the light sources 142. In addition, or in the alternative, the power supply 140 can receive power from a source external to the light fixture 102. In addition, or in the alternative, the power supply 140 can be a source of power in itself. For example, the power supply 140 can be a battery, a localized photovoltaic power system, or some other source of independent power.

As stated above, the light fixture 102 can be placed in any of a number of environments. In such a case, the housing 103 of the light fixture 102 can be configured to comply with applicable standards for any of a number of environments. For example, the housing 103 of a light fixture 102 can be rated as a Division 1 or a Division 2 enclosure under NEC standards. This compliance with applicable standards when a portion of the antenna assembly 139 is disposed in the ambient environment while the remainder of the antenna assembly 139 is disposed within the housing 103 of the light fixture 102.

Figure 2:
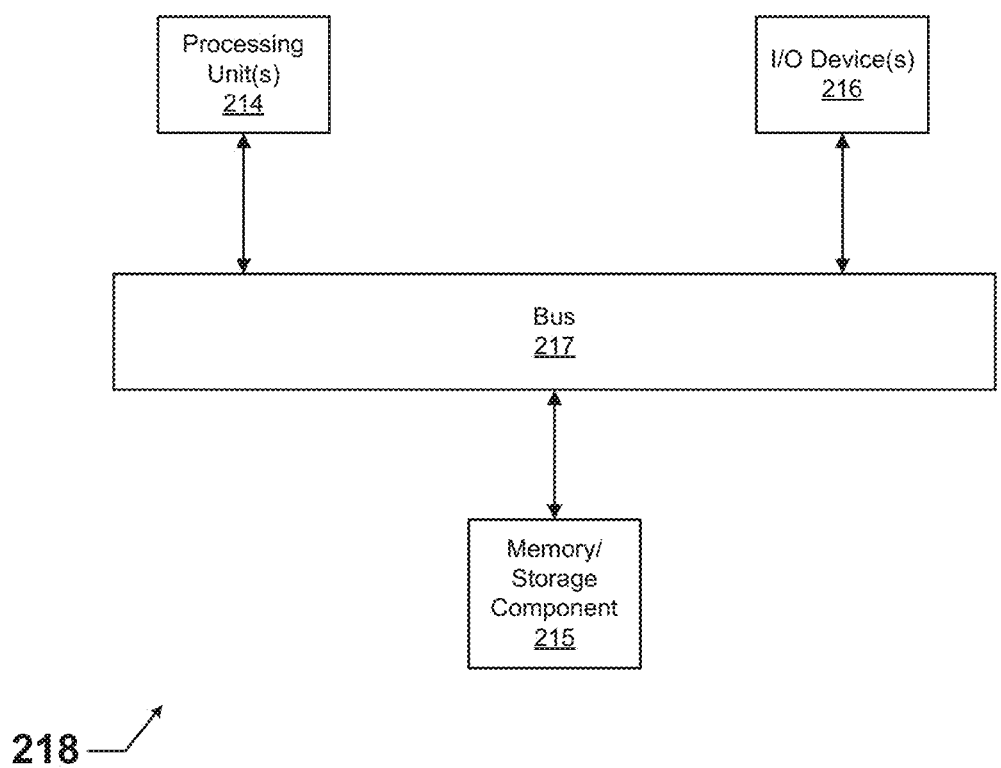
FIG. 2 shows a computing device in accordance with certain example embodiments.

FIG. 2 illustrates one embodiment of a computing device 218 that implements one or more of the various techniques described herein, and which is representative, in whole or in part, of the elements described herein pursuant to certain exemplary embodiments. Computing device 218 is one example of a computing device and is not intended to suggest any limitation as to scope of use or functionality of the computing device and/or its possible architectures. Neither should computing device 218 be interpreted as having any dependency or requirement relating to any one or combination of components illustrated in the example computing device 218.

Computing device 218 includes one or more processors or processing units 214, one or more memory/storage components 215, one or more input/output (I/O) devices 216, and a bus 217 that allows the various components and devices to communicate with one another. Bus 217 represents one or more of any of several types of bus structures, including a memory bus or memory controller, a peripheral bus, an accelerated graphics port, and a processor or local bus using any of a variety of bus architectures. Bus 217 includes wired and/or wireless buses.

Memory/storage component 215 represents one or more computer storage media. Memory/storage component 215 includes volatile media (such as random access memory (RAM)) and/or nonvolatile media (such as read only memory (ROM), flash memory, optical disks, magnetic disks, and so forth). Memory/storage component 215 includes fixed media (e.g., RAM, ROM, a fixed hard drive, etc.) as well as removable media (e.g., a Flash memory drive, a removable hard drive, an optical disk, and so forth).

One or more I/O devices 216 allow a customer, utility, or other user to enter commands and information to computing device 218, and also allow information to be presented to the customer, utility, or other user and/or other components or devices. Examples of input devices include, but are not limited to, a keyboard, a cursor control device (e.g., a mouse), a microphone, a touchscreen, and a scanner. Examples of output devices include, but are not limited to, a display device (e.g., a monitor or projector), speakers, outputs to a lighting network (e.g., DMX card), a printer, and a network card.

Various techniques are described herein in the general context of software or program modules. Generally, software includes routines, programs, objects, components, data structures, and so forth that perform particular tasks or implement particular abstract data types. An implementation of these modules and techniques are stored on or transmitted across some form of computer readable media. Computer readable media is any available non-transitory medium or non-transitory media that is accessible by a computing device. By way of example, and not limitation, computer readable media includes "computer storage media".

"Computer storage media" and "computer readable medium" include volatile and non-volatile, removable and non-removable media implemented in any method or technology for storage of information such as computer readable instructions, data structures, program modules, or other data. Computer storage media include, but are not limited to, computer recordable media such as RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which is used to store the desired information and which is accessible by a computer.

The computer device 218 is connected to a network (not shown) (e.g., a local area network (LAN), a wide area network (WAN) such as the Internet, cloud, or any other similar type of network) via a network interface connection (not shown) according to some exemplary embodiments. Those skilled in the art will appreciate that many different types of computer systems exist (e.g., desktop computer, a laptop computer, a personal media device, a mobile device, such as a cell phone or personal digital assistant, or any other computing system capable of executing computer readable instructions), and the aforementioned input and output means take other forms, now known or later developed, in other exemplary embodiments. Generally speaking, the computer system 218 includes at least the minimal processing, input, and/or output means necessary to practice one or more embodiments.

Further, those skilled in the art will appreciate that one or more elements of the aforementioned computer device 218 is located at a remote location and connected to the other elements over a network in certain exemplary embodiments. Further, one or more embodiments is implemented on a distributed system having one or more nodes, where each portion of the implementation (e.g., control engine 106) is located on a different node within the distributed system. In one or more embodiments, the node corresponds to a computer system. Alternatively, the node corresponds to a processor with associated physical memory in some exemplary embodiments. The node alternatively corresponds to a processor with shared memory and/or resources in some exemplary embodiments.

Figure 3:
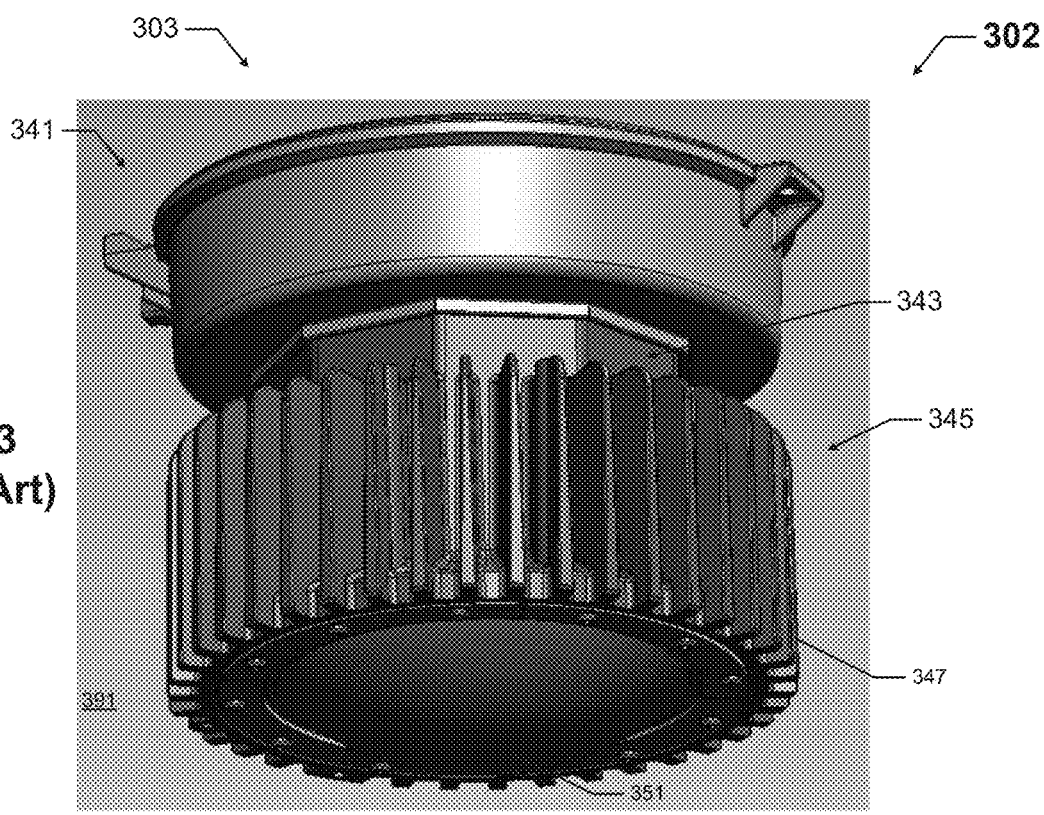
FIG. 3 shows a light fixture with which example embodiments can be used.

FIG. 3 shows a light fixture 302 with which example embodiments can be used. Referring to FIGS. 1-3, the light fixture 302 of FIG. 3 is disposed in an ambient environment 391 and includes a housing 303 and a number of light sources (hidden from view in FIG. 3 by the lens 351). The housing 303 can have one or more sections. In this case, the housing 303 consists of section 341 and section 343. Section 341 is disposed atop section 343 and is sometimes called a top hat. In this case, the top half of section 341 is removed. Section 341 can form a cavity (hidden from view, but such as cavity 101), inside of which one or more components (e.g., one or more power supplies 140, the controller 104) of the light fixture 302 can be disposed.

Similarly, one or more components (e.g., one or more light sources, the controller 104) of the light fixture 302 can be disposed on or within section 343 of the housing 303. When a component is disposed on a section (e.g., section 343) of the housing 303, a protective device (e.g., a lens 351) can be used, at least in part, to cover and protect such components. When the housing 303 has multiple sections, there can be one or more communication links (e.g., communication link 105) disposed between them.

One or more portions of the housing 303 can be made of a thermally conductive material (e.g., metal). In some cases, such as with the light fixture 302 of FIG. 3, a heat sink assembly 345 (also sometimes referred to more simply herein as a heat sink 345) can be disposed on and/or integrated with one or more portions of the housing 303 (or section thereof). In this particular example, the heat sink 345 is integrated with a portion of section 343 of the housing 303. A heat sink assembly 345 often has one or more features (in this case, heat sink fins 347) that increase the surface area of the heat sink assembly 345, thereby increasing its thermal transfer efficiency.

These features of the heat sink assembly 345 can be of any number in quantity and/or have any of a number of configurations. In this case, the heat sink fins 347 are vertically-oriented protrusions that extend radially outward from the section 343 of the housing 303 and are spaced substantially equidistantly around the outer perimeter of the section 343 of the housing 303. In addition, the heat sink fins 347 are substantially the same shape and size as each other.

Figure 4B:
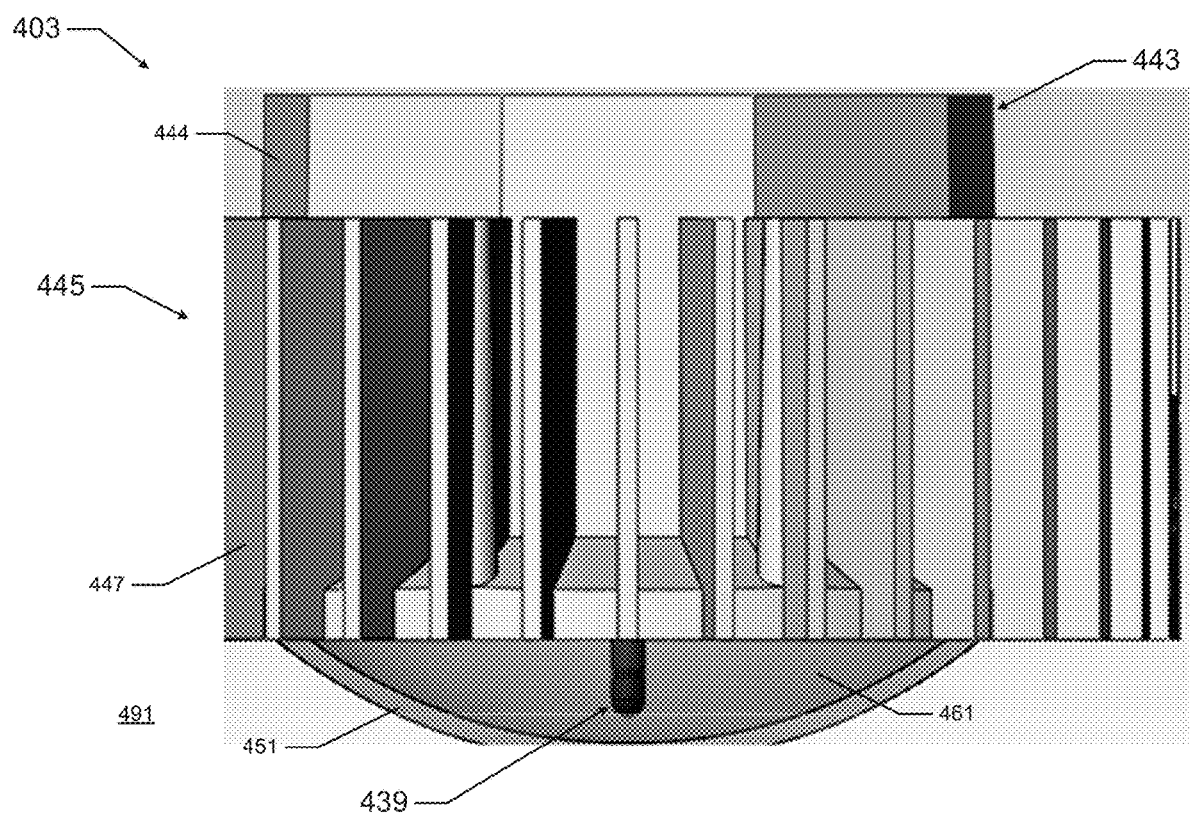
Figure 4C:
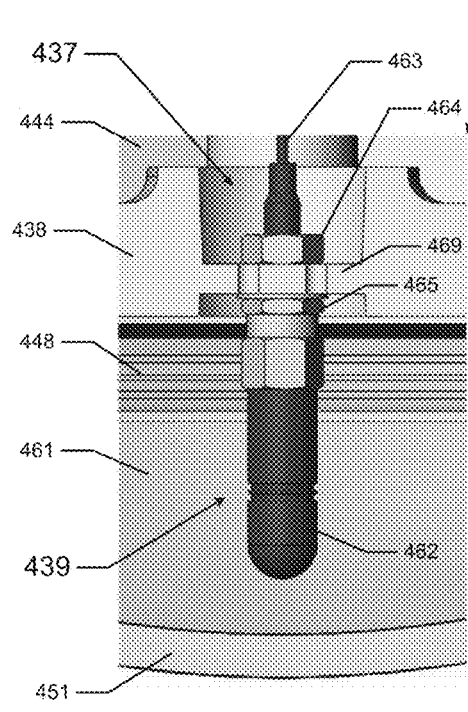
Figure 4D:
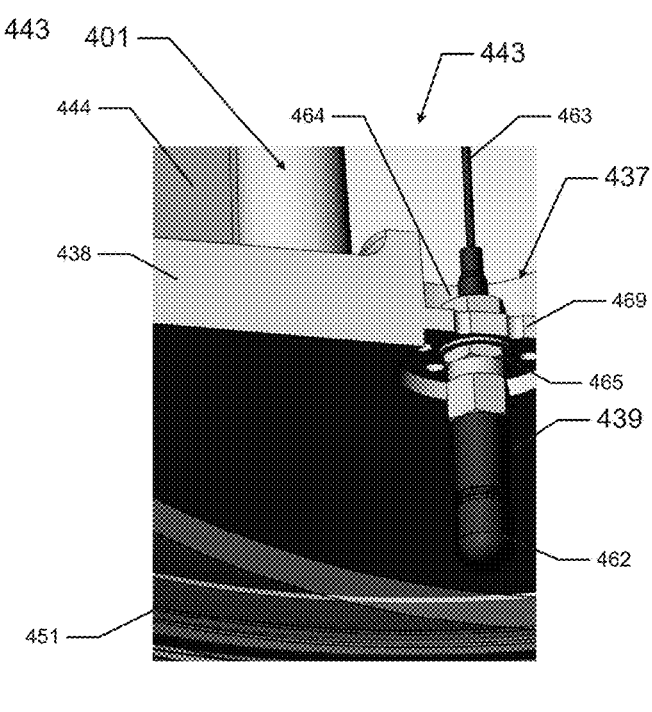

FIGS. 4A-4E show a light fixture 402 with an antenna assembly 439 in accordance with certain example embodiments. Specifically, FIG. 4A shows a bottom front perspective view of the light fixture 402. FIG. 4B shows a side view of a portion of the light fixture 402. FIG. 4C shows a cross-sectional side view of a portion of the light fixture 402 that details the antenna assembly 439. FIG. 4D shows a cross-sectional bottom-side perspective view of a portion of the light fixture 402 that details the antenna assembly 439 with the circuit board 448 and the light sources 442 removed. FIG. 4E shows a cross-sectional top-side perspective view of a portion of the light fixture 402 that details the antenna assembly 439 with the circuit board 448 and the light sources 442 removed. The light fixture 402 of FIGS. 4A-4E is substantially the same as the light fixture 302 of FIG. 3, except as described below.

Referring to FIGS. 1-4E, the light fixture 402 of FIGS. 4A-4E can be the physical embodiment of the light fixture 102 of FIG. 1. As with the light fixture 302 of FIG. 3, the light fixture 402 of FIGS. 4A-4E is disposed in an ambient environment 491 and includes a housing 403 and a number of light sources 442 (visible in FIG. 4A through the transparent lens 451). The housing 403 in this case consists of section 441 and section 443. Section 441 is disposed atop section 443. Again, in this case, the top half of section 441 is removed. Section 441 can form a cavity (hidden from view, but such as cavity 101), inside of which one or more components (e.g., one or more power supplies 140, the controller 104) of the light fixture 402 can be disposed.

Similarly, one or more components (e.g., one or more light sources 442, the controller 104, the antenna assembly 439) of the light fixture 402 can be disposed on or within section 443 of the housing 403. In this example, a portion of the antenna assembly 439 is disposed entirely within the housing 403, and the remainder of the antenna assembly 439 is disposed within a cavity 461 enclosed by the lens 451. The housing 403 of FIGS. 4A-4E also includes a heat sink assembly 445 integrated with a portion of section 443 of the housing 403, where the heat sink fins 447 of the heat sink assembly 445 extend away from the wall 444 of the section 443 of the housing 403.

Antenna assemblies used with light fixtures in hazardous environments in the current art protrude from an outer surface of the housing of the light fixture, thus leaving them exposed and subject to objects and/or harmful effects (e.g., corrosion, moisture) that can be caused by exposure to the ambient environment. Further, such antenna assemblies used with light fixtures in hazardous environments in the current art require a separate housing that must be individually designed to comply with applicable standards for an enclosure disposed in a hazardous environment. These currently-used antenna assemblies are expensive to build and difficult to protect from the hazardous ambient environment, leading to reduced reliability and a safety risk. In addition, the range of signal coverage of currently-used antenna assemblies is limited because the light fixture tends to block or degrade the signals that are sent to or received by the antenna assembly but that pass through the light fixture. In addition, even with less-than-optimal coverage, currently-used antenna assemblies require manipulation so that signal transmission interference from the light fixture is not as great as it could be.

Figure 10:
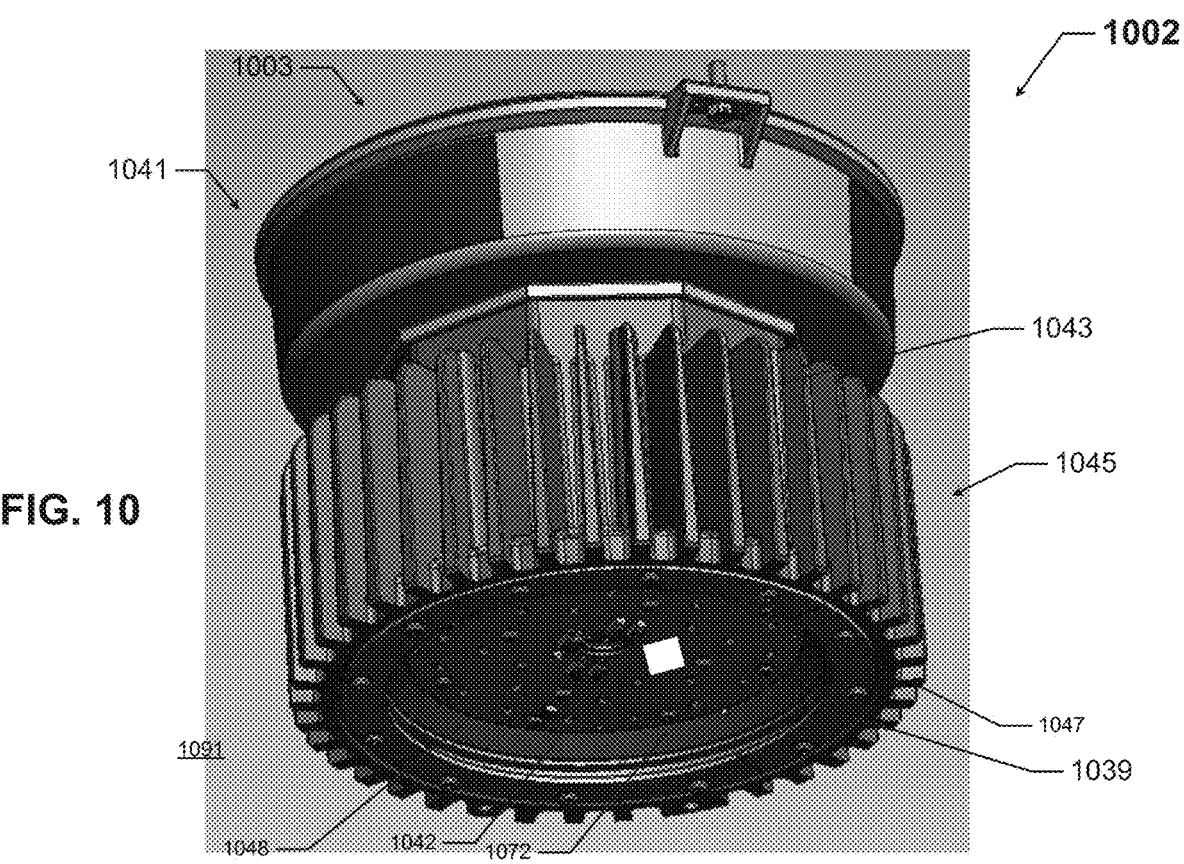
FIG. 10 shows a portion of a light fixture with yet another antenna assembly in accordance with certain example embodiments.

The antenna assembly 439 of the light fixture 402 of FIGS. 4A-4E overcomes these shortcomings of the current art. In this example, the antenna assembly 439 is mounted within the cavity 461 formed by the lens 451 adjacent to the light sources 442. For example, in this case, a portion of the antenna assembly 439 protrudes through an aperture in the circuit board 448 on which the light sources 442 are disposed. This allows the antenna assembly 439 to send and/or receive signals substantially unobstructed (downward hemispherical coverage) by the housing 403 of the light fixture 402. (In this example, the lens 451 may provide some minimal, insignificant signal obstruction or interference.) In alternative embodiments, the antenna assembly 439 can be mounted on the circuit board 448 and extend within the cavity 461 outward (toward the lens 451) from the circuit board 448. In yet other alternative embodiments, as shown in FIG. 10 below, the antenna assembly 439 can include trace wire disposed on or otherwise integrated with the circuit board 448 without protruding from (or protruding minimally (e.g., 0.1 inches) from) the circuit board 448.

Figure 8:
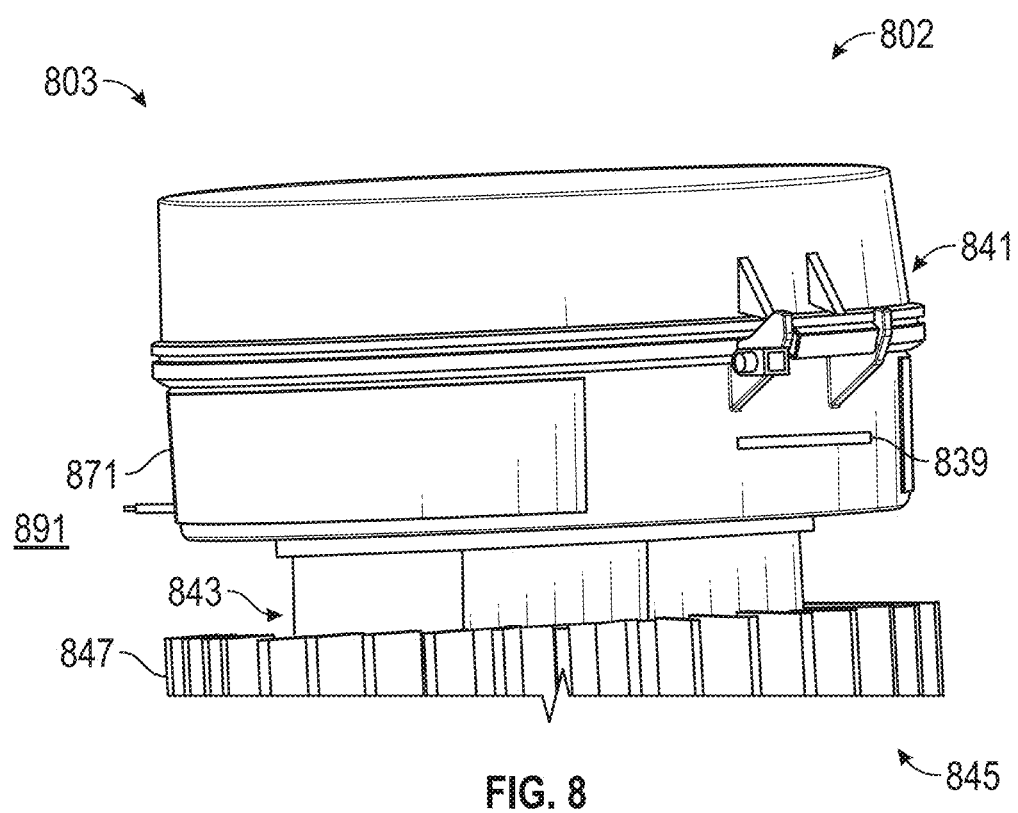
FIG. 8 shows a portion of a light fixture with yet another antenna assembly in accordance with certain example embodiments.
Figure 9:
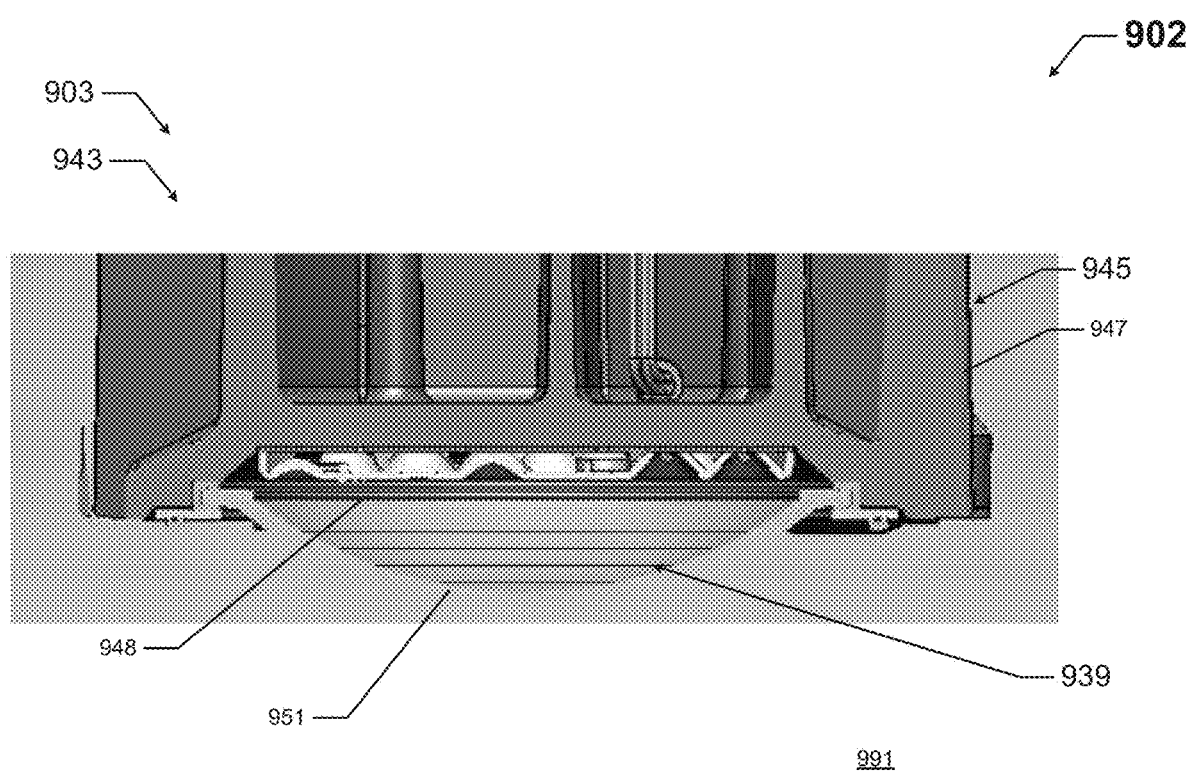
FIG. 9 shows a portion of a light fixture with still another antenna assembly in accordance with certain example embodiments.

In still other example embodiments, as shown in FIG. 8 below, the antenna assembly 439 can include trace wire disposed on or otherwise integrated with a portion (e.g., portion 431) of the housing 403. In still other example embodiments, as shown in FIG. 9 below, the antenna assembly 439 can include trace wire disposed on or otherwise integrated with the lens 451. In this particular example, since the antenna assembly 439 is within the cavity 461 formed by the lens 451, the lens 451 serves both to diffuse the light emitted by the light sources 442 and to protect the portion of the antenna assembly 439 disposed within the cavity 461.

Also, if the ambient environment 491 is a hazardous environment, the lens 451, along with the housing 403 to which the lens 451 is coupled, must comply with applicable standards for hazardous environments. As a result, since part of the antenna assembly 439 is disposed within the cavity 461 formed by the lens 451, while the remainder of the antenna assembly 439 is disposed within the cavity 401 formed by the section 443 of the housing 403, the antenna assembly 439 can be installed without causing any alteration to the light fixture 403 with respect to compliance with applicable standards for hazardous locations, and also without any special consideration for the antenna assembly 439 to independently comply with such standards.

The antenna assembly 439 can be shaped and sized in such a way as to have minimal or no effect on the light emitted by the light sources 442. In some cases, one or more optical features (e.g., a reflector, a diffuser) can be disposed proximate to the antenna assembly 439 to reduce or eliminate any adverse effects on the light emitted by the light sources 442 that could result from a portion of the antenna assembly 439 protruding beyond the circuit board 448. Further, as explained above, in addition or in the alternative, a portion of the antenna assembly 439 can be integrated with one or more components of the light fixture 402, including but not limited to the lens 451 and the circuit board 448.

As discussed above, the example antenna assembly 439 can include one or more of a number of components. In this case, the antenna assembly 439 includes a transmitter/receiver 462, a wire 463 (a form of communication link (e.g., communication link 105)), coupling feature 464, and coupling feature 465. The antenna assembly 439 is anchored to a coupling feature 437 disposed in a bottom wall 438 of the section 443 of the housing 403. In this case, coupling feature 464 and coupling feature 465 are each nuts, where coupling feature 464 rotates relative to threads disposed on an outer surface of a portion (hidden from view) of the antenna assembly 439 to abut against the bottom surface of the wall 469 of the coupling feature 437, while coupling feature 465 rotates relative to threads disposed on an outer surface of the same or a different portion (also hidden from view) of the antenna assembly 439 to abut against the top surface of the wall 469 of the coupling feature 437.

The coupling feature 437 of the section 443 of the housing 403 in this case is a recessed area of the bottom wall 438 of the section 443 of the housing 403, where the recessed area includes an aperture (hidden from view by the antenna assembly 439) that traverses wall 469 of the coupling feature 437, where the wall 469 divides the recessed area of the coupling feature 437, and where a portion of the antenna assembly 439 traverses the aperture in the wall 469. The transmitter/receiver 462 of the antenna assembly 439 is disposed in the cavity 461 formed by the lens 451. The wire 463 is disposed in the cavity 401 of the section 443 of the housing 403 and can be coupled to some other component (e.g., the controller 104) of the light fixture 402.

When the coupling feature 437 is a recessed area, as in this example, it can be defined, at least in part, by a wall 468. In some cases, the recessed area can serve one or more other purposes aside from receiving and securing a portion of the antenna assembly 439. For example, the recessed area can serve as a potting chamber, and so the wall 468 of the coupling feature 437 can be used to receive a potting compound. In such a case, a number of smaller apertures 467 used to receive wires between the housing 403 and the cavity 461 formed by the lens 451 (such as for the circuit board 448 or a component disposed thereon) can traverse the wall 469 of the coupling feature 437, and the potting compound disposed in the coupling feature 437 would provide protection for these wires, as well.

Figure 5:
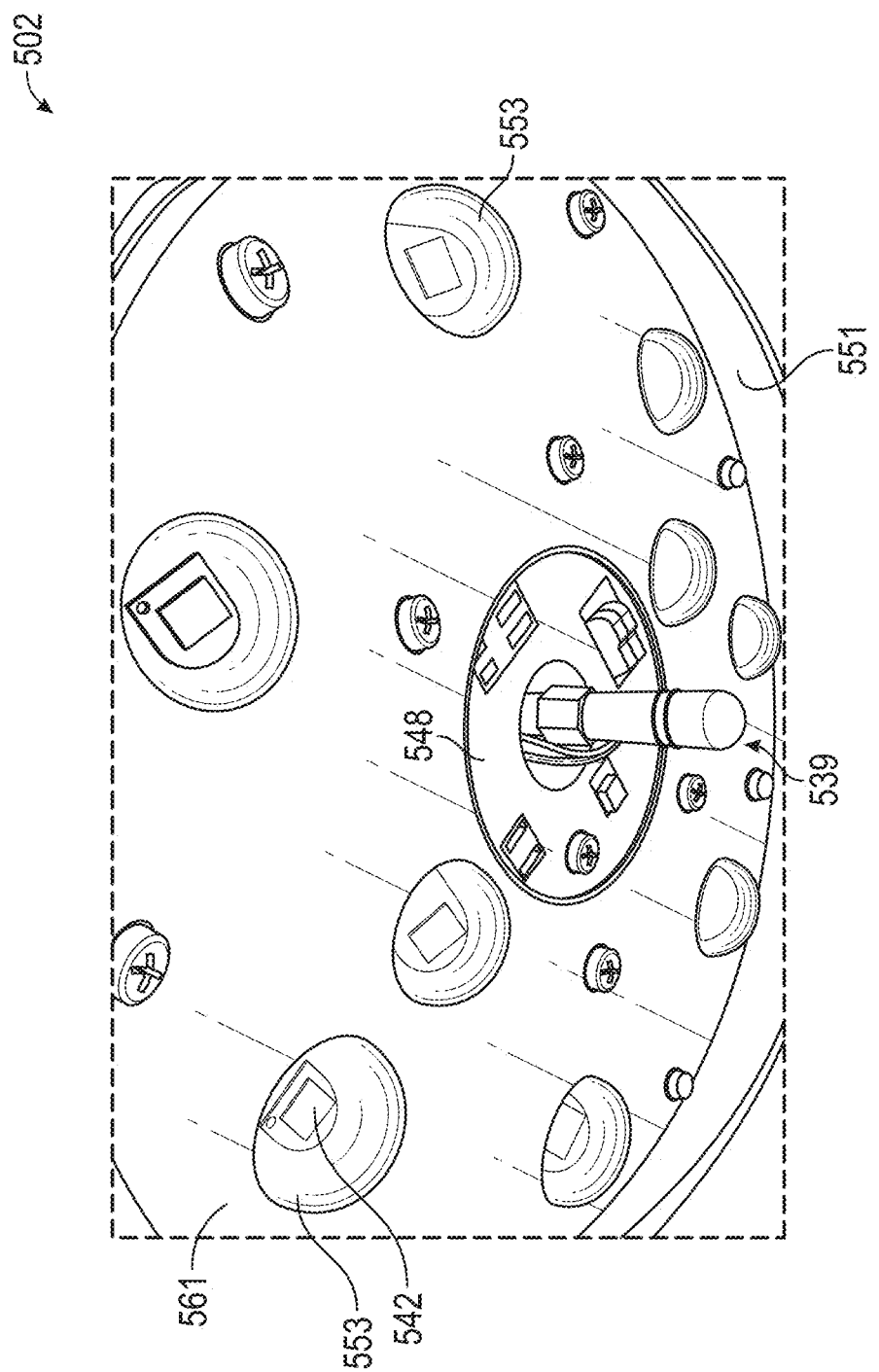
FIG. 5 shows a portion of another light fixture with an antenna assembly in accordance with certain example embodiments.

FIG. 5 shows a portion of another light fixture 502 with an antenna assembly 539 in accordance with certain example embodiments. Referring to FIGS. 1-5, the light fixture 502 of FIG. 5 is substantially the same as the light fixture 402 of FIGS. 4A-4E, except as described below. For example, the light fixture 502 includes a lens 551 that covers a number of light sources 542 disposed on a circuit board 548. A portion of an antenna assembly 539 protrudes through an aperture in the center of the circuit board 548 and extends into the cavity 561 formed by the lens 551. The lens 551 also includes a number of localized diffusers 553 disposed over each of the light sources 542. In such a case, the localized diffusers 553 can help direct the light emitted by the light sources 542 and avoid interference from the portion of the antenna assembly 539 that extends into the cavity 561 formed by the lens 551.

FIGS. 6A and 6B show a portion of yet another light fixture 602 with an antenna assembly 639 in accordance with certain example embodiments. Specifically, FIG. 6A shows a top-side perspective view of the portion of the light fixture 602. FIG. 6B shows a different top-side perspective view of the portion of the light fixture 602. Referring to FIGS. 1-6B, the light fixture 602 of FIGS. 6A and 6B is substantially similar to the light fixtures described above, except as described below. For example, the light fixture 602 of FIGS. 6A and 6B have a section 643 of the housing 603 that includes heat sink fins 647 of a heat sink assembly 645 that extends from the wall 644 of the section 643.

In this case, the antenna assembly 639 is partly disposed in the ambient environment 691. Specifically, the transmitter/receiver 662 of the antenna assembly 639 is disposed in the ambient environment 691, and the remainder (e.g., the wire 663) of the antenna assembly 639 is disposed in cavity 601 formed by the wall 644 of the section 643 of the housing 603. The wire 663 can be coupled to some other component (e.g., the controller 104) of the light fixture 602.

The antenna assembly 639 includes a bulkhead connector 664,665 that couples to the wall 644 (at an aperture (hidden from view and a type of coupling feature) that traverses the wall 644) of the section 643 of the housing 603 in accordance with applicable standards. For example, the bulkhead connector 664,665 can include full mating threads that traverse completely through the aperture in the wall 644 of the section 643 of the housing 603 to meet Class II Division 1 requirements for an enclosure (in this case, a light fixture) under the NEC. In such a case, the mating threads of the bulkhead connector 664,665 can form a flame path with the wall 644 of the section 643 of the housing 603. Similarly, the remainder of the antenna assembly 639 that is disposed within the section 643 of the housing 603 can also be created so that the housing 603 complies with applicable standards. As another example, potting, sealing (e.g., silicone), or other form of encapsulation can be used relative to the bulkhead connector 664 disposed within the cavity formed by the wall 644 of the section 643 of the housing 603.

Figure 7:
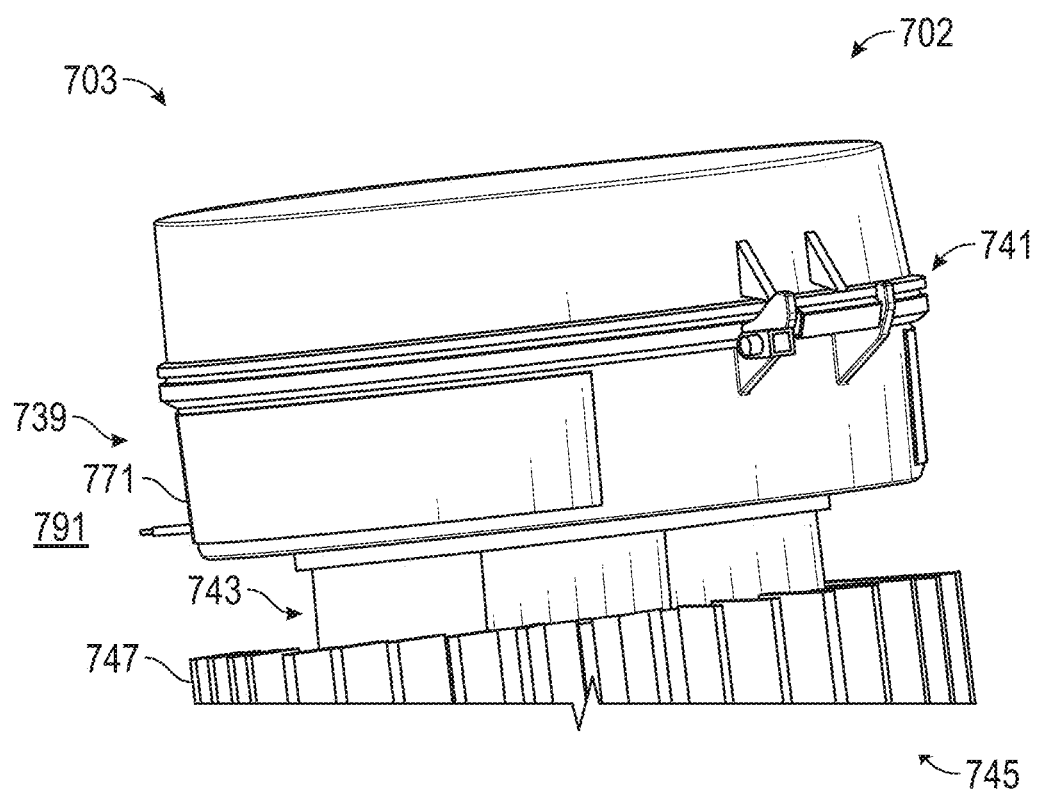
FIG. 7 shows a portion of still another light fixture with an antenna assembly in accordance with certain example embodiments.

FIG. 7 shows a portion of still another light fixture 702 with an antenna assembly 739 in accordance with certain example embodiments. Referring to FIGS. 1-7, the portion of the light fixture 702 of FIG. 7 includes an antenna assembly 739 that is integrated with an information medium 771. In such a case, the antenna assembly 739 conforms to the shape of the portion (in this case portion 741) of the housing 703 of the light fixture 702 on which the antenna assembly 739 is disposed. The information medium 771 can be a sticker (e.g. adhered), nameplate (e.g., mechanically attached), or other feature that can be found on the outer surface of the light fixture 702. The information medium 771 can include light fixture information (e.g., voltage, manufacturer, lumen output) about the light fixture 702 and/or warning information (e.g., caution for shock hazard) associated with operation of the light fixture 702.

Here, at least a portion of the antenna assembly 739 includes a flex circuit that is printed or traced, thereby having a very low profile (e.g., less than 0.1 inches). As a result, any protrusion of the portion of the antenna assembly 739 that is exposed to the ambient environment 791 relative to the portion (in this case, portion 741 of the housing 703) of the light fixture 702 on which such portion of the antenna assembly 739 is disposed is negligible. As an alternative, at least a portion of the antenna assembly 739 can be disposed on the outer surface of the section 743 of the housing 703, above the heat sink fins 747 of the heat sink assembly 745.

FIG. 8 shows a portion of a light fixture 802 with yet another antenna assembly 839 in accordance with certain example embodiments. Referring to FIGS. 1-8, the portion of the light fixture 802 of FIG. 8 includes an antenna assembly 839 that is integrated with the housing 803. In this case, the antenna assembly 839 is integrated with (e.g., etched on, printed on) a wall of the section 841 of the housing 803, In such a case, the antenna assembly 839 conforms to the shape of the portion (in this case portion 841) of the housing 803 of the light fixture 802 on which the antenna assembly 839 is disposed. Here, at least a portion of the antenna assembly 839 includes a flex circuit that is printed or traced, thereby having a very low profile (e.g., less than 0.1 inches). As a result, any protrusion of the portion of the antenna assembly 839 that is exposed to the ambient environment 891 relative to the portion (in this case, section 841 of the housing 803) of the light fixture 802 on which such portion of the antenna assembly 839 is disposed is negligible. As an alternative, at least a portion of the antenna assembly 839 can be disposed on the outer surface of the section 843 of the housing 803, above the heat sink fins 847 of the heat sink assembly 845.

FIG. 9 shows a portion of a light fixture 902 with still another antenna assembly 939 in accordance with certain example embodiments. Referring to FIGS. 1-9, the portion of the light fixture 902 of FIG. 9 includes an antenna assembly 939 that is integrated with the lens 951. In this case, the antenna assembly 939 is fused with a glass portion of the lens 951, similar to how a defroster is integrated with a rear car window, In such a case, the antenna assembly 939 conforms to the shape of the portion (in this case, the lens 951) of the housing 903 of the light fixture 902 on which the antenna assembly 939 is disposed. Again, the portion of the antenna assembly 939 disposed in the lens 951 can have a very low profile (e.g., less than 0.1 inches). Thin film technology can also be used to layer the antenna assembly 939 within and/or on the lens 951. When the antenna assembly 939 is integrated with the lens 9251, it can be done in such a way as to have minimal to no effect on the light emitted by the light sources of the light fixture 902.

FIG. 10 shows a portion of a light fixture 1002 with yet another antenna assembly 1039 in accordance with certain example embodiments. Referring to FIGS. 1-10, the lens is removed from FIG. 10 to more easily show the antenna assembly 1039. Specifically, the portion of the light fixture 1002 of FIG. 10 includes an antenna assembly 1039 that is integrated with (e.g., etched on, printed on) the circuit board 1048 on which the light sources 1042 are disposed, Here, at least a portion of the antenna assembly 1039 can include a flex circuit that is printed or traced, thereby having a very low profile (e.g., less than 0.1 inches). In this way, the antenna assembly 1039 has minimal to no effect on the light emitted by the light sources 1042 of the light fixture 1002. As an alternative, at least a portion of the antenna assembly 1039 can be disposed on another surface or component within the cavity (similar to cavity 461 described above) formed by the lens. For example, the antenna assembly 1039 can be disposed on the side surface 1072 of the housing 1003 within the cavity formed by the lens.

Aside from the example antenna assemblies shown and described above, other examples of antenna assemblies can include integrating the antenna assembly with any other component (e.g., the housing of a sensor module) of the light fixture, which can be executed in one or more of any number of ways using one or more of a number of technologies, whether now know or to be developed in the future.

Example embodiments can allow for more reliable and efficient communication with light fixtures, particularly when those light fixtures are located in hazardous environments. Example embodiments can also allow for a broader range of coverage for signal transmission. Example embodiments allow for antenna assemblies (or portions thereof) to be integrated with (e.g., disposed within, coupled to an exterior of, made part of an exterior component of) a light fixture while allowing the light fixture to comply with applicable standards.

Although embodiments described herein are made with reference to example embodiments, it should be appreciated by those skilled in the art that various modifications are well within the scope and spirit of this disclosure. Those skilled in the art will appreciate that the example embodiments described herein are not limited to any specifically discussed application and that the embodiments described herein are illustrative and not restrictive. From the description of the example embodiments, equivalents of the elements shown therein will suggest themselves to those skilled in the art, and ways of constructing other embodiments using the present disclosure will suggest themselves to practitioners of the art. Therefore, the scope of the example embodiments is not limited herein.

What is claimed is:

1. A light fixture, comprising:
   a housing comprising at least one wall that forms a cavity, wherein the housing complies with applicable standards for a hazardous environment and the at least one wall of the housing has an aperture that traverses therethrough; and
   an antenna assembly comprising a connector that couples to the housing at the aperture, the connector comprising mating threads that completely traverse the aperture in the at least one wall and form a flame path with the at least one wall,
   wherein the antenna assembly provides communication with another device within the hazardous environment without compromising the applicable standards for the hazardous environment.

2. The light fixture of claim 1, wherein a portion of the antenna assembly is disposed in the hazardous environment and is coupled to the at least one wall at the aperture, and wherein a remainder of the antenna assembly is disposed within the cavity of the housing.

* * * * *